(12) United States Patent  
Hansen

(10) Patent No.: US 7,701,382 B2  
(45) Date of Patent: Apr. 20, 2010

(54) RADAR DETECTION CIRCUIT FOR A WLAN TRANSCEIVER

(75) Inventor: Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 257 days.

(21) Appl. No.: 11/607,488

(22) Filed: Dec. 1, 2006

(65) Prior Publication Data

US 2007/0281638 A1 Dec. 6, 2007

Related U.S. Application Data

(63) Continuation-in-part of application No. 11/415,841, filed on May 2, 2006, which is a continuation-in-part of application No. 10/815,163, filed on Mar. 31, 2004, and a continuation-in-part of application No. 10/815, 161, filed on Mar. 31, 2004.

(60) Provisional application No. 60/502,934, filed on Sep. 15, 2003, provisional application No. 60/844,779, filed on Sep. 15, 2006, provisional application No. 60/735,521, filed on Nov. 11, 2005.

(51) Int. Cl.
*G01S 13/00* (2006.01)

(52) U.S. Cl. .............................. 342/52; 342/89; 342/20

(58) Field of Classification Search ................ 375/340; 455/63.1; 342/137, 52, 57
See application file for complete search history.

(56) References Cited

U.S. PATENT DOCUMENTS

| 3,543,156 A | 11/1970 | Chester, et al. |
| 3,660,844 A | 5/1972 | Potter |
| 4,014,018 A | 3/1977 | Williams et al. |
| 4,181,910 A | 1/1980 | Hitterdal |
| 4,566,010 A | 1/1986 | Collins et al. |
| 4,682,173 A | 7/1987 | Kotoh et al. |
| 4,698,632 A | 10/1987 | Baba et al. |
| 4,740,045 A | 4/1988 | Goodson et al. |
| 4,996,532 A | 2/1991 | Kirimoto et al. |
| 5,017,921 A | 5/1991 | McGill et al. |
| H001005 H | 12/1991 | Gerlach |
| 5,091,729 A | 2/1992 | Cantwell et al. |

(Continued)

FOREIGN PATENT DOCUMENTS

WO    02082844 A2    10/2002

(Continued)

*Primary Examiner*—Ian J Lobo  
(74) *Attorney, Agent, or Firm*—Garlick Harrison & Markison; James A. Harrison

(57) ABSTRACT

A single chip radio transceiver includes circuitry that enables detection of radar signals to enable the radio transceiver to halt communications in overlapping communication bands to avoid interference with the radar transmitting the radar pulses. The radio transceiver is operable to evaluate a number of most and second most common pulse interval values to determine whether a traditional radar signal is present. The radio transceiver also is operable to FM demodulate an incoming signal to determine whether a non-traditional radar signal, such as a bin-5 radar signal, is present. After. FM demodulation, the signal is averaged wherein a substantially large value is produced for non-traditional radar signals and a value approximately equal to zero is produced for a communication signal that is not FM modulated with a continuously increasing frequency signal. Gain control is used to limit incoming signal magnitude to a specified range of magnitudes.

22 Claims, 19 Drawing Sheets

U.S. PATENT DOCUMENTS

| | | | |
|---|---|---|---|
| 5,115,244 A | 5/1992 | Freedman et al. |
| 5,128,683 A | 7/1992 | Freedman et al. |
| 5,473,332 A | 12/1995 | James et al. |
| 5,604,503 A | 2/1997 | Fowler et al. |
| 5,657,326 A | 8/1997 | Burns et al. |
| 5,748,142 A | 5/1998 | Rademacher |
| 5,889,821 A | 3/1999 | Arnstein et al. |
| 5,990,833 A | 11/1999 | Ahlbom et al. |
| 6,351,502 B1 | 2/2002 | Zargari |
| 6,522,295 B2 | 2/2003 | Baugh et al. |
| 6,703,968 B2 | 3/2004 | Baugh |
| 6,710,743 B2 | 3/2004 | Benner et al. |
| 6,738,021 B2 | 5/2004 | Benner et al. |
| 6,798,381 B2 | 9/2004 | Benner et al. |
| 6,801,163 B2 | 10/2004 | Baugh et al. |
| 6,839,026 B2 | 1/2005 | Baugh et al. |
| 6,879,281 B2 | 4/2005 | Gresham et al. |
| 6,891,496 B2 | 5/2005 | Husted et al. |
| 6,930,638 B2 | 8/2005 | Lloyd et al. |
| 6,954,171 B2 | 10/2005 | Husted et al. |
| 7,012,552 B2 | 3/2006 | Baugh et al. |
| 7,019,692 B2 | 3/2006 | Baugh et al. |
| 7,027,530 B2 | 4/2006 | McFarland et al. |
| 7,099,627 B2 | 8/2006 | Turner et al. |
| 7,129,884 B1 | 10/2006 | Tehrani et al. |
| 7,155,230 B2 | 12/2006 | Tsien |
| 7,254,191 B2 | 8/2007 | Sugar et al. |
| 7,292,656 B2 | 11/2007 | Kloper et al. |
| 7,292,711 B2 | 11/2007 | Kiraly et al. |
| 7,376,878 B2 | 5/2008 | Kleewein |
| 7,408,907 B2 | 8/2008 | Diener |
| 7,414,572 B2 | 8/2008 | D'Amico |
| 7,424,268 B2 | 9/2008 | Diener et al. |
| 7,424,269 B2 | 9/2008 | Trainin et al. |
| 7,436,352 B2 | 10/2008 | Theobold et al. |
| 7,480,324 B2 | 1/2009 | Aiello et al. |
| 7,545,308 B2 | 6/2009 | Mitsugi |
| 7,593,692 B2 | 9/2009 | Hansen |
| 2002/0198650 A1 | 12/2002 | Baugh et al. |
| 2003/0020653 A1 | 1/2003 | Baugh et al. |
| 2003/0107512 A1 | 6/2003 | McFarland et al. |
| 2003/0169827 A1 | 9/2003 | Shi et al. |
| 2003/0198200 A1 | 10/2003 | Diener et al. |
| 2003/0206130 A1 | 11/2003 | Husted et al. |
| 2003/0214430 A1 | 11/2003 | Husted et al. |
| 2004/0013128 A1 | 1/2004 | Moreton et al. |
| 2004/0047324 A1 | 3/2004 | Diener |
| 2004/0201517 A1 | 10/2004 | MacFarlane et al. |
| 2004/0233102 A1 | 11/2004 | Baugh et al. |
| 2004/0246177 A1 | 12/2004 | Lloyd et al. |
| 2005/0046609 A1 | 3/2005 | Wasiewicz |
| 2005/0059363 A1 | 3/2005 | Hansen |
| 2005/0059364 A1 | 3/2005 | Hansen et al. |
| 2005/0162304 A1 | 7/2005 | Mitsugi |
| 2006/0199587 A1 | 9/2006 | Hansen |
| 2006/0258296 A1* | 11/2006 | Steer et al. ............. 342/52 |
| 2008/0031386 A1* | 2/2008 | Tsai et al. ............. 375/340 |

FOREIGN PATENT DOCUMENTS

| | | |
|---|---|---|
| WO | 03001742 A1 | 1/2003 |
| WO | 03050560 A1 | 6/2003 |

* cited by examiner

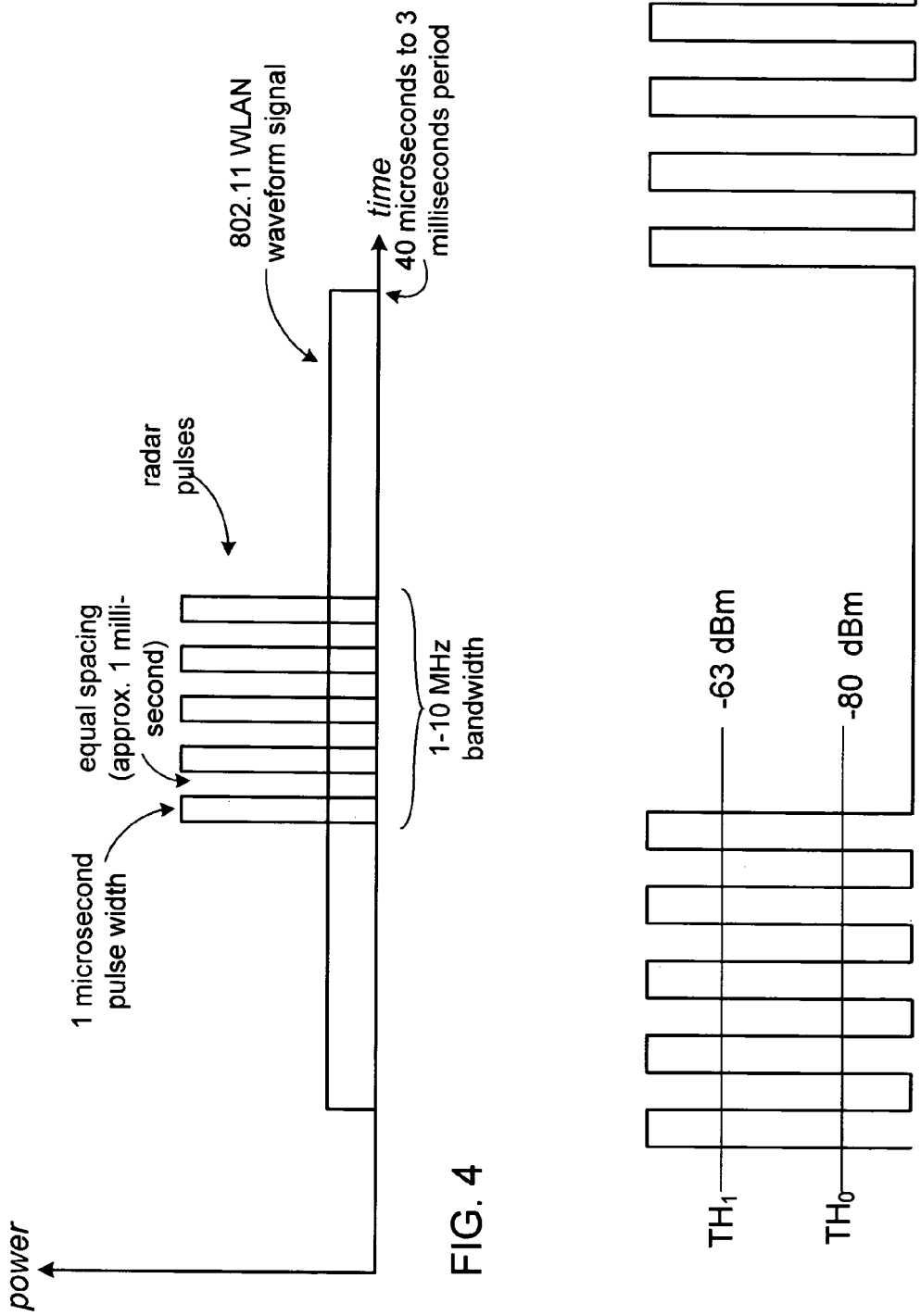

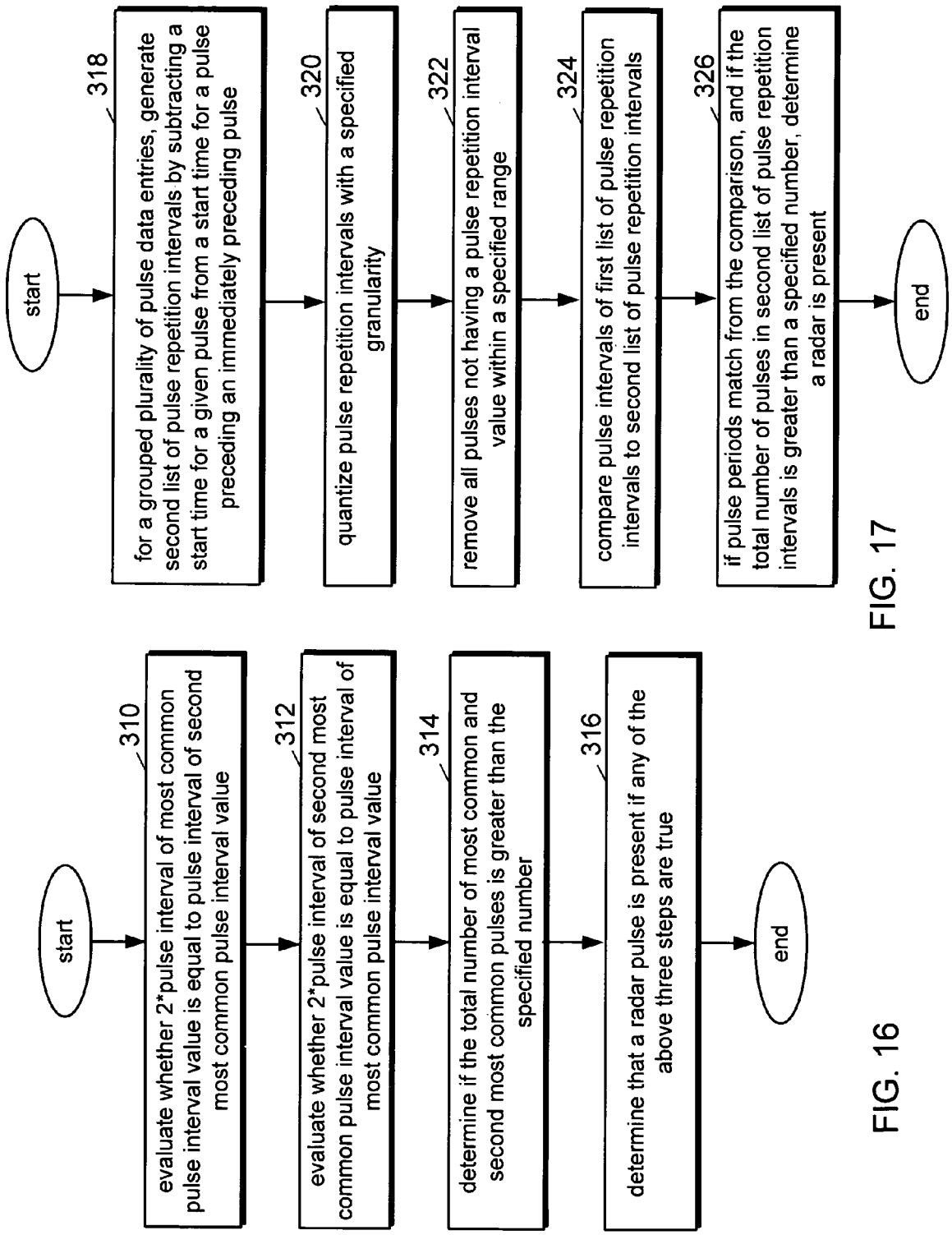

RADAR DETECTION CIRCUIT FOR A WLAN TRANSCEIVER

CROSS REFERENCE TO RELATED PATENTS

This application claims priority to U.S. Provisional Application having a Ser. No. of 60/844,779 and a filing date of Sep. 15, 2006, and is a continuation-in-part of, and further claims priority to, U.S. application Ser. No. 11/415,841 and a filing date of May 2, 2006, and further claims priority to:

The present U.S. Utility Patent Application claims priority pursuant to 35 U.S.C. §119(e) to the following U.S. Provisional Patent Application which is hereby incorporated herein by reference in its entirety and made part of the present U.S. Patent Application for all purposes:
1. U.S. Provisional Application Ser. No. 60/844,779, entitled "Radar Detection Circuit for a WLAN Transceiver,", filed Sep. 15, 2006.

The present U.S. Patent Application claims priority pursuant to 35 U.S.C. §120, as a continuation-in-part (CIP), to the following U.S. Patent Application which is hereby incorporated herein by reference in its entirety and made part of the present U.S. Patent Application for all purposes:
1. U.S. application Ser. No. 11/415,841, entitled "Radar Detection Circuit for a WLAN Transceiver," filed May 2, 2006, pending, which claims priority to and incorporated herein by reference in its entirety and made part of the present U.S. Patent Application for all purposes, the following applications as follows:
    a. Pursuant to 35 U.S.C. §119(e) to U.S. Provisional Application Ser. No. 60/735,521, entitled "Radar Detection Circuit for a WLAN Transceiver," filed Nov. 11, 2005.
    b. Pursuant to 35 U.S.C. §120, as a continuation-in-part (CIP) to U.S. application Ser. No. 10/815,163, entitled "Radar Detection Circuit for a WLAN Transceiver," filed Mar. 31, 2004, pending, which claims priority pursuant to 35 U.S.C. §119(e) to the following U.S. Provisional Patent Application:
        i. U.S. Provisional Application Ser. No. 60/502,934, entitled "Radar Detection Circuit for a WLAN Receiver", filed Sep. 15, 2003.
    c. Pursuant to 35 U.S.C. §120, as a continuation-in-part (CIP) to U.S. application Ser. No. 10/815,161, entitled "Radar Detection from Pulse Record with Interference," filed Mar. 31, 2004, pending, which claims priority pursuant to 35 U.S.C. §119(e) to the following U.S. Provisional Patent Application:
        i. U.S. Provisional Application Ser. No. 60/502,934, entitled "Radar Detection Circuit for a WLAN Receiver", filed Sep. 15, 2003.

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard.

One approach to using a higher intermediate frequency is to convert the RF signal to an intermediate frequency sufficiently low to allow the integration of on-chip channel selection filters. For example, some narrow band or low data rate systems, such as Bluetooth, use this low intermediate frequency design approach.

Active mixers used in direct conversion radios, as well as radios that employ an intermediate conversion step typically comprise input transconductance elements, switches and an output load. These active mixers often have varying output signal characteristics due to environmental conditions, such as temperature, and process and manufacturing variations. These varying output signal characteristics can, for example, result in a mixer producing an errant local oscillation signal that affects the accuracy of an output signal's frequency. Having inaccurate output frequencies can result in many undesirable outcomes, including unwanted signal filtering by a downstream filter.

Other approaches are also being pursued to achieve the design goal of building entire radios on a single chip. With all of the foregoing design goals, however, there is being realized an increasing need for additional frequency bands for use by radio receivers and transmitters of all types. Along these lines, a frequency band that has heretofore been reserved exclusively for radar systems is being opened for use for at least some types of wireless communication systems. Among other systems, wireless local area network (LAN) systems are being developed to take advantage of the frequency band that is being opened up which has been reserved for radar. One design issue, however, that accompanies any wireless LAN device that operates in this frequency band is that of coexistence with radar systems. More specifically, a need exists for a wireless LAN transceiver to give priority to a radar when a radar operation is detected. Accordingly, the wireless LAN, in such a scenario, would be required to detect a radar signal within a specified response time and to communicate over a non-overlapping frequency band thereto.

Along these lines, recent changes to government regulations will allow wireless LANs (WLANs) to share frequency spectrum with licensed radar systems. Specifically, the frequency bands 5.25-5.35 GHz and 5.27-5.75 GHz will be open in Europe, and perhaps worldwide at some point in the future. Since these frequency bands are shared, the wireless LANs will be required to take a subordinate role to the licensed radar systems. This includes the incorporation of dynamic frequency selection (DFS) within the WLAN that will avoid spectrum that is occupied by a radar. What is needed, therefore, is a circuit and method for determining when a radar signal is present.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 4 is a diagram that illustrates the relative difference between a traditional radar signal waveform and an 802.11 wireless LAN waveform signal;

FIG. 5 is a diagram that illustrates two groups (blocks) of pulses of a radar signal;

FIG. 16 is a flowchart illustrating a method for performing radar detection processing for missing pulses;

FIG. 17 is a flowchart illustrating a method for performing radar detection processing for extra pulses;

DETAILED DESCRIPTION OF THE DRAWINGS

Figure 1:
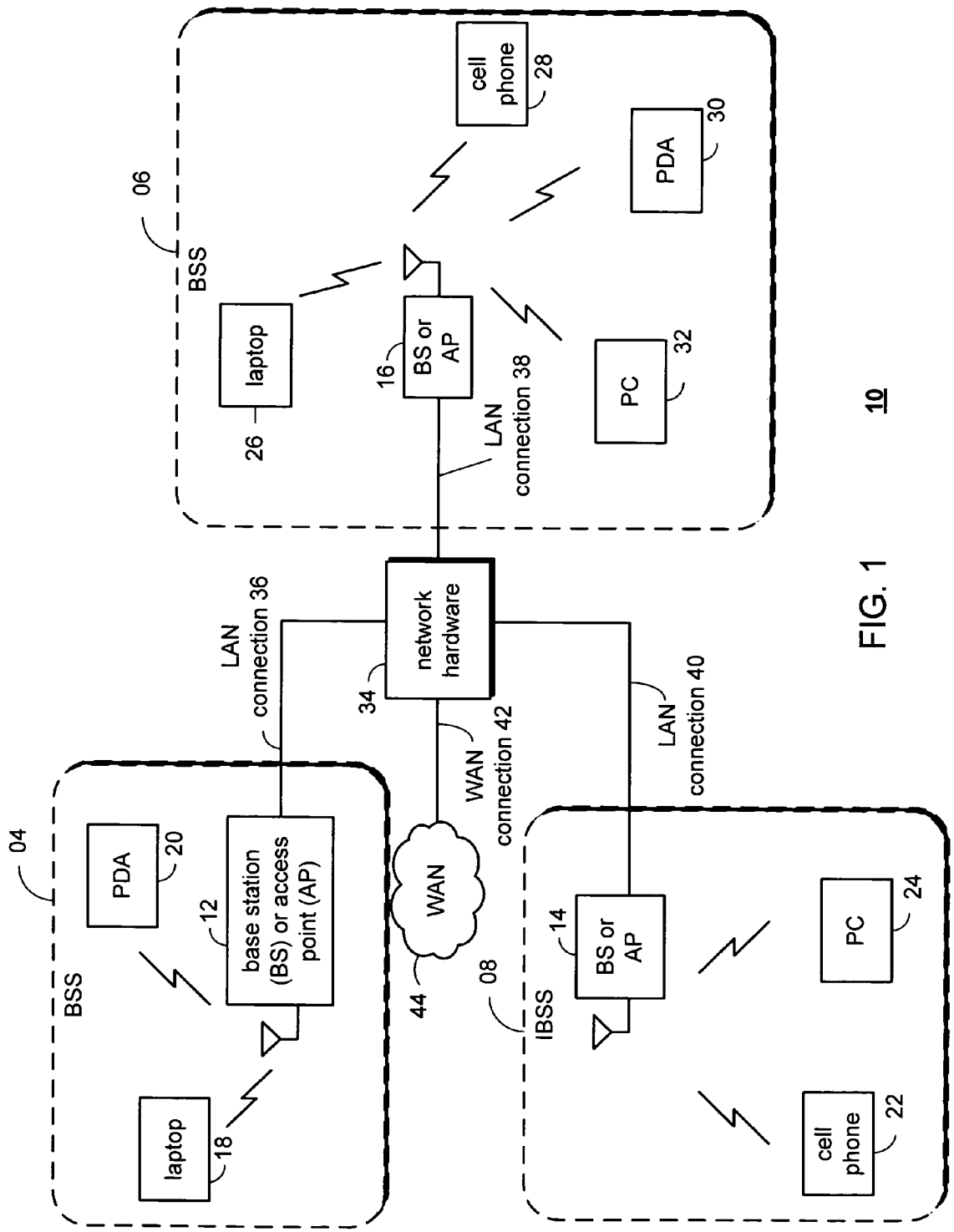
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to figures described below.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Any such communication device of FIG. 1 that is operable to transmit over a specified radar frequency includes one or more embodiments of the present invention.

Figure 2:
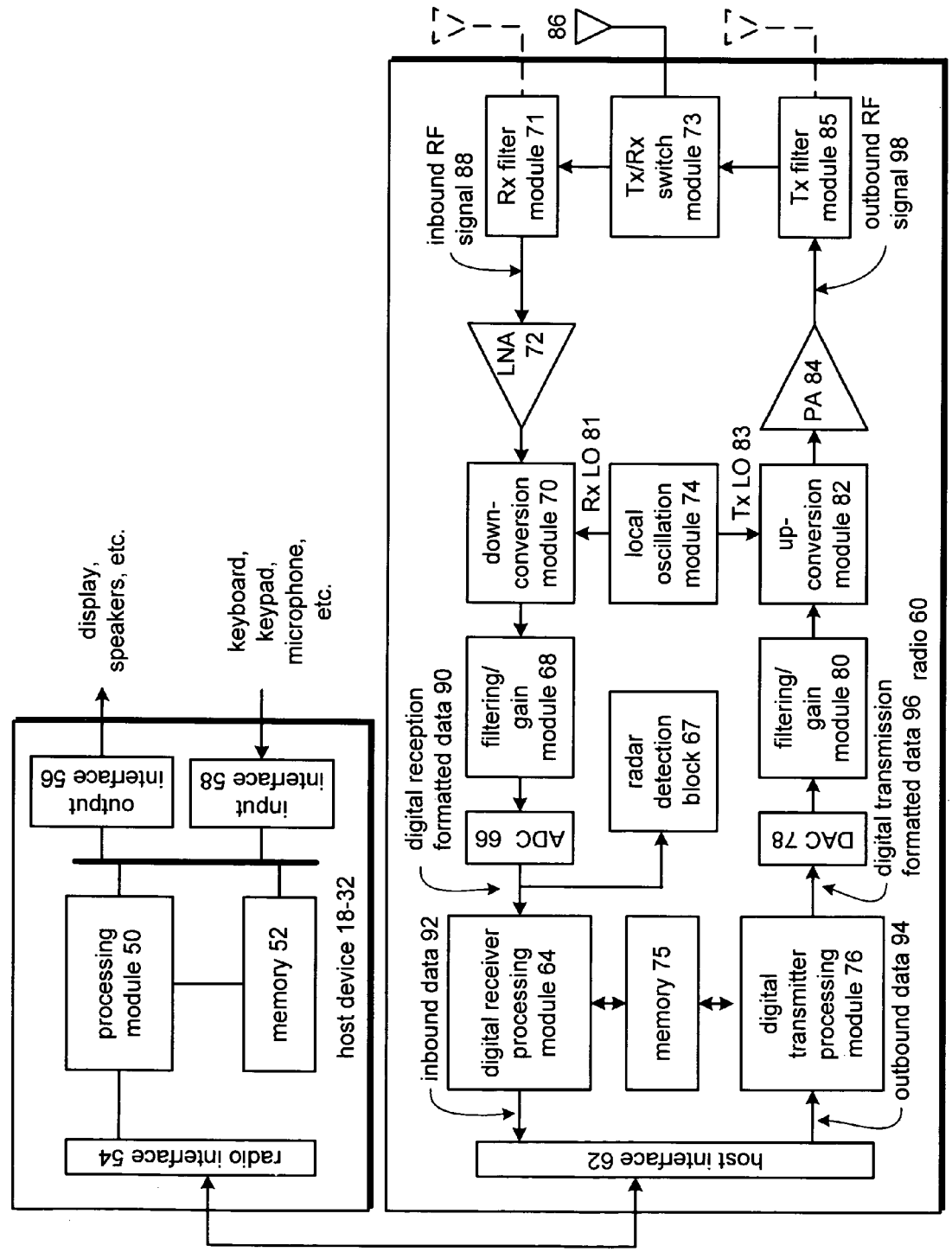
FIG. 2 is a schematic block diagram illustrating a wireless communication device as a host device and an associated radio.

FIG. 2 is a functional block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50; a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a radar detection block 67, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

The radar detection block 67 is operable to receive a digital low frequency signal (either a baseband frequency or intermediate frequency signal in a digital form) from ADC 66 and to process such digital low frequency signal to determine whether a radar signal is present. In the described embodiment, radar detection block 67 is operable to detect both traditional radar pulses as well as newer non-traditional radar pulses including so called "bin 5" radar signals.

Radar detection block 67, though shown as one block, may be implemented across several blocks including the digital transmitter processing module 76. Generally, radar detection block 67 represents state or circuit level logic, computer instructions in memory that define related logic, or a combination of the state or circuit level logic and computer instructions. Generally though, radar detection block 67, upon detecting a radar signal, prompts radio 60 to inhibit communications in frequency bands that overlap with radar and, in the case of ongoing communications, to switch outgoing communications to a non-overlapping frequency band (non-overlapping with radar).

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, access point or other wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
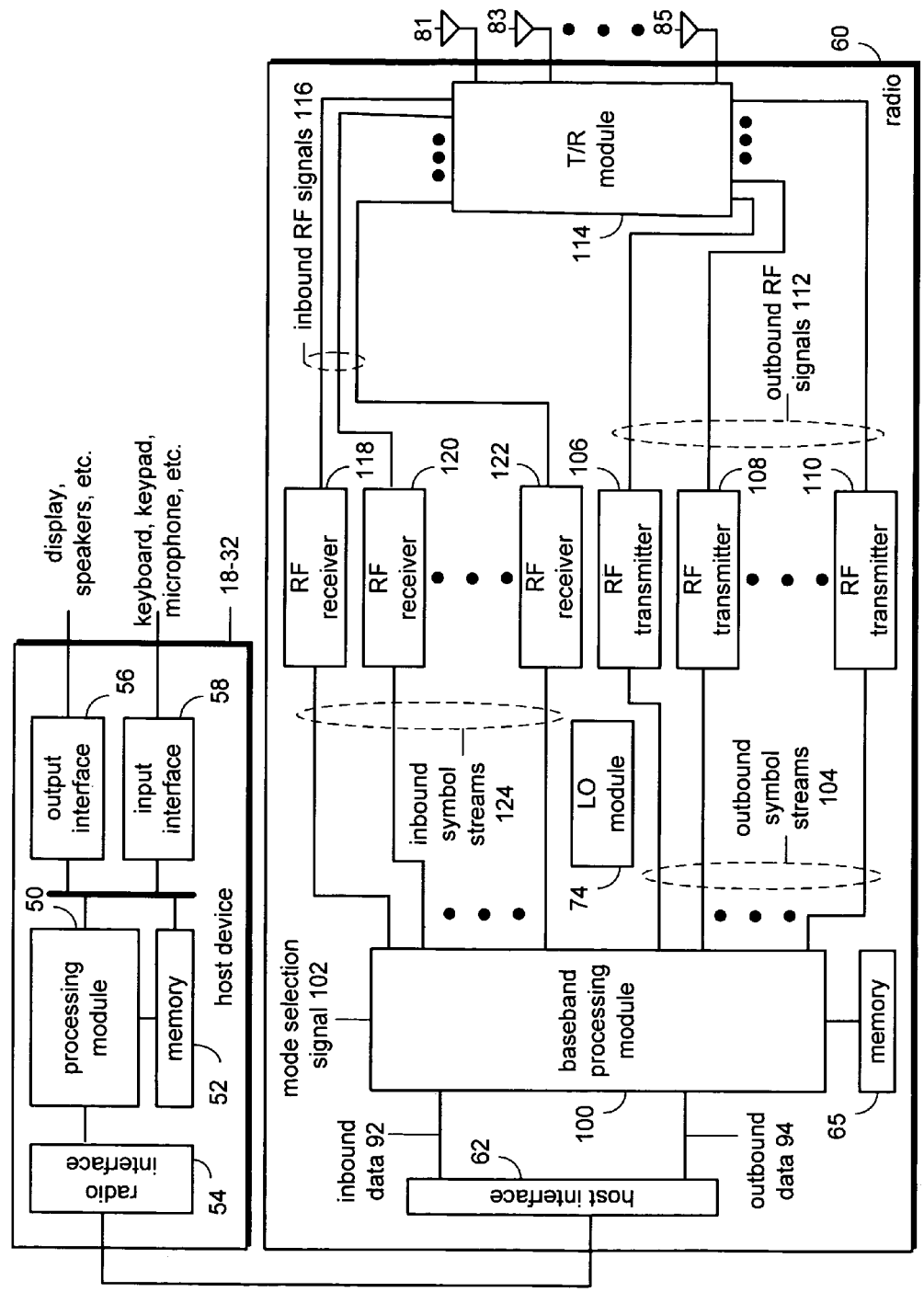
FIG. 3 is a schematic block diagram illustrating a wireless communication device as a host device and an associated radio with multiple input and output signal paths for generating and received multiple communication signals.

FIG. 3 is a functional block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a multiple input multiple output (MIMO) wireless communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 are enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100. While not shown specifically in FIG. 3, it is understood that the embodiment of FIG. 3 includes one or more radar detection blocks such as radar detection block 67 of FIG. 2 to modify or inhibit outgoing transmissions from RF transmitters 106-110 for detected radar signals by one or more of RF receivers 118-122. In one embodiment, for example, a radar detected on a radar receiver that receives ingoing communication signals from a specified area or direction would result in outgoing transmissions being inhibited that may interfere with such a signal. In an alternate embodiment, detection of a radar on any of the receive signal paths by any of the receivers 188-122 results in all outgoing transmissions on a radar frequency being inhibited. In yet another embodiment, only outgoing transmissions having a characteristic that may interfere with a radar of a specified characteristic are inhibited.

FIG. 4 is a diagram that illustrates the relative difference between a traditional radar signal waveform and an 802.11 wireless LAN waveform signal. Generally, it may be seen that radar signal pulses have a significantly higher magnitude than the 802.11 wireless LAN waveform signal. Additionally, radar pulses have a much shorter pulse width. In the example shown, each radar pulse has a 1 microsecond pulse width and is spaced apart by approximately 1 millisecond (though the figure is not to scale). The 802.11 wireless LAN waveform signal, in contrast, has a period that equals at least 40 microseconds and can equal 3 milliseconds in duration. Thus, the waveform of the radar pulses and the 802.11 wireless LAN signal are notably different, however, which facilitates detection by a radar detection block operable to detect traditional radar as disclosed herein.

Continuing to examine FIG. 4, it may be noted that the radar pulses come in blocks. While 5 pulses per block are shown, it is understood that each block of pulses may have a different number of pulses. Generally, the radar pulses are in the 5.25-5.75 GHz frequency band having a 1 to 10 MHz bandwidth. The 802.11 frequency bands that are approximate to the frequency band of radar range from 5.15-5.35 MHz and from 5.725-5.825 MHz. Accordingly, it may be seen that an overlap exists between these two frequency bands for 802.11 with the frequency band for the radar pulses.

FIG. 5 is a diagram illustrating two groups (blocks) of pulses of a radar signal. Generally, it is a goal to detect a radar signal before a second group of pulses is received. Accordingly, as may be seen for the first group of pulses, a radar detection block, and more particularly, a state machine of the radar detection block in conjunction with a processor, must be able to detect and determine that a radar signal is present from the five pulses shown of the first group of pulses in FIG. 5. As is understood, a common characteristic of radars is that the radar antenna oscillates or rotates thereby radiating any one point in space only for a limited time while the point in space is within a beam angle of the radar antenna. Accordingly, even though the radar continuously produces radar pulses, they are seen by the receiver in groups and then are not seen as the radar antenna sweeps away.

As may further be seen, a plurality of threshold levels is defined. These threshold levels are used by the state machine and the processor, in one embodiment, to determine that a traditional radar signal is present. The logic for concluding that a radar signal is present in relation to the pulses will be described in greater detail below. Generally, it may be seen that the first threshold level ($TH_0$), in one embodiment of the invention, is defined to be within the range of −80 decibels per meter (dBm). A second threshold ($TH_1$) is defined at −63 dBm.

The thresholds $TH_0$ and $TH_1$ are chosen in order to meet the requirements for radar detection sensitivity and to avoid false alarms and thus may be modified so long as this design goal is considered for a particular radar having known signal characteristics. In a first embodiment, absolute thresholds are used. The choice of $TH_0$ is made by first estimating the probability of detection and probability of false alarm for the expected environment. In an ideal environment (known radar signals in additive white Gaussian noise (AWGN) the computation is straightforward. However, in practice, the thresholds will are adjusted in the described embodiments of the invention in a dynamic fashion in order to maximize radar detection performance.

Figure 6:
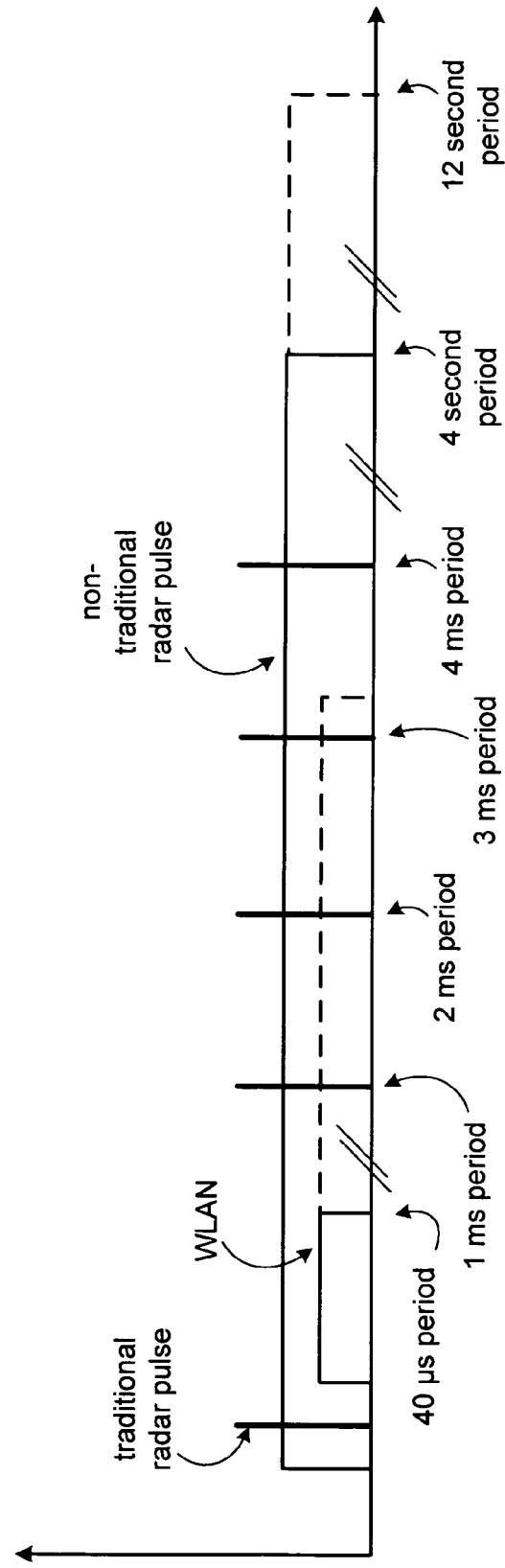
FIG. 6 is a diagram that illustrates the difference in signal length for WLAN signals, traditional radar signals, and non-traditional radar signals and is used to explain operational aspects of the various embodiments of the present invention.

While FIGS. 4 and 5 are used to illustrate the relative difference traditional radar and an 802.11 WLAN signal, FIG. 6 illustrates the difference in signal length for WLAN signals, traditional radar signals, and non-traditional radar signals and is used to explain operational aspects of the various embodiments of the present invention. Specifically, it may be seen that the WLAN signal has a period that varies from 40 microseconds to slightly more than 3 milliseconds. A group of 5 traditional radar pulses are shown to approximately span a 4 millisecond period. The bin 5 non-traditional radar, however, may have a period as long as 12 seconds. As such, the mere use of signal length to detect non-traditional radar signals may result in false detections because OFDM signals may, when combined, appear long and may trigger false positives.

Generally, traditional existing radar signals comprise a series of short pulses. The new "bin 5" radar pulses, however, is more random, and can comprise, for example either a single 12 second pulse that shows up as a single pulse or in groups of three (4 seconds each). Thus, these bin 5 and other non-traditional radar pulses can be difficult to detect. Thus, the described embodiments of the invention contemplate the use of an FM demodulator to detect long pulses with linear FM modulation on it. As radar effectiveness may be improved by FM modulating the radar pulse, the use of a demodulator can identify that a long pulse may be a radar signal. Thus, we modify radar detector to detect longer pulses by increasing a FIFO buffer size among other changes and by including an FM demodulator to detect FM modulation. With such an arrangement, if no FM modulation is detected, as will be explained in greater detail below, the radar detection logic is operable to conclude that no non-traditional radar is present.

Figure 7:
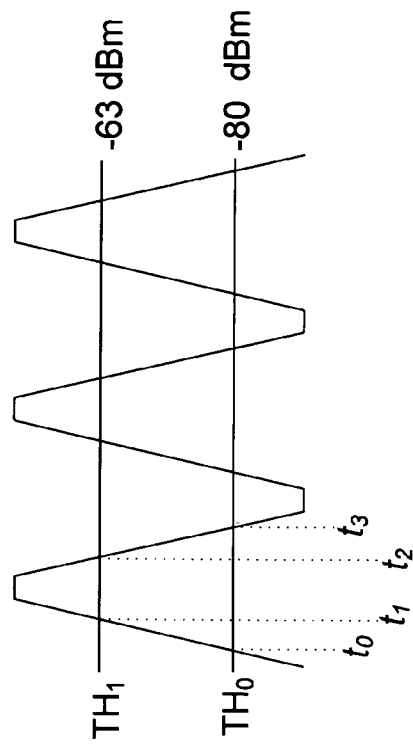
FIG. 7 is a diagram that illustrates the measurement of rise time and fall time of the pulses of the radar signal for both traditional and non-traditional radar pulses.

FIG. 7 is a diagram that illustrates the measurement of rise time and fall time of the pulses of the radar signal for both traditional and non-traditional radar pulses. More specifically, a time to is defined as being when a rising pulse crosses the first threshold $TH_0$. A second time value $t_1$ is defined when the pulse crosses the second threshold $TH_1$. A third time period is defined, $t_2$, as being the time when a falling pulse crosses the $TH_1$ threshold. Finally, a fourth time is defined as $t_3$ whenever the falling pulse crosses threshold $TH_0$. By measuring the rise and fall times, the state machine and processor executed logic, in the described embodiment, may better determine whether a radar pulse was detected.

The logic portion performed by the processor may also be implemented with hardware such as application specific integrated computer logic, field programmable gate array logic, etc. These crossings of $TH_0$ and $TH_1$ enable a processor, state machine or other logic performing pulse detection operations to measure a rise time, a fall time, a pulse width and a total signal period. These measured signal characteristics make up what is referred herein also as pulse information that is entered within a table for evaluation to facilitate determination as to whether a radar signal is present. In one embodiment, more than two of the values of t0-t4 are used. In an alternate embodiment, the values of t1 and t2 are used to detect a pulse length as a part of radar detection logic.

Figure 8:
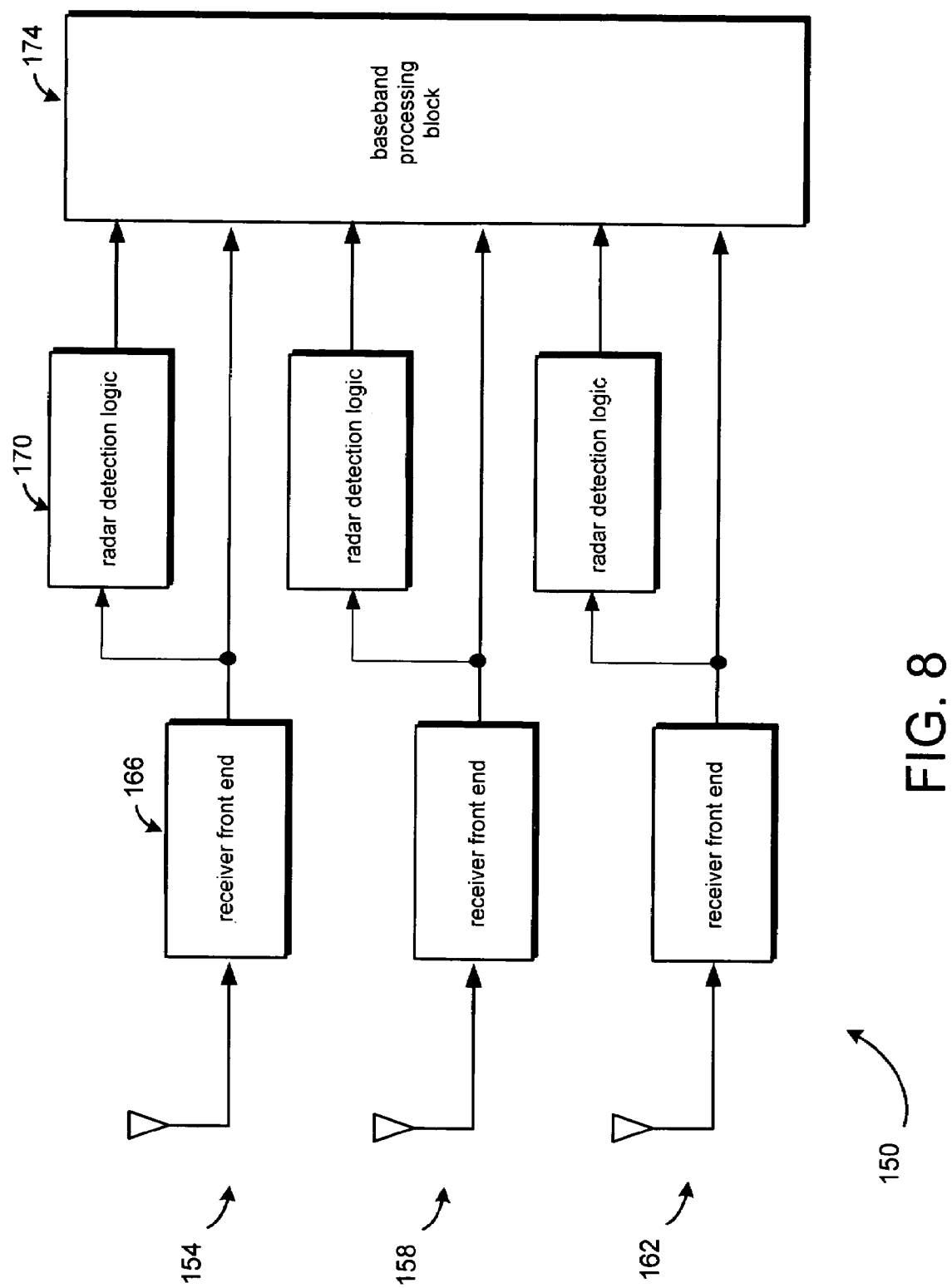
FIG. 8 is a functional block diagram of a MIMO radio transceiver, and more specifically, of a receiver portion of a radar transceiver according to one embodiment of the invention.

FIG. 8 is a functional block diagram of a MIMO radio transceiver, and more specifically, of a receiver portion of a radar transceiver according to one embodiment of the invention. As may be seen, the transceiver 150 includes a plurality of receive paths shown generally at 154, 158 and 162. In one embodiment of the invention, transceiver 150 includes only two receive paths, namely, paths 154 and 158. Each path 154-162 is similar in structure to the others of paths 154-162 and it should be understood, therefore, that a MIMO transceiver and the concepts relating to the present invention may be applied to a transceiver having any number of receive paths similar to receive path 154. Because of the similarity of the multiple receive paths, only receive path 154 is described herein.

As may be seen, receive path 154 includes a receiver 166 that includes radio front end processing blocks that are operable to receive an RF signal from an antenna and to downconvert, amplify and filter the received signal and then to produce an ingoing digital signal that represents one of a baseband or intermediate frequency (IF) signal. In the described embodiment, therefore, receiver front end 166 produces a low frequency (baseband or IF) digital signal. While a single receive path is shown as a single ended path, it should be understood that many embodiments produce in-phase (I) and quadrature-phase (Q) signal paths that may be either single ended or differential for a receive signal path.

FIG. 8 further illustrates that the described embodiment of the invention includes a radar detection logic 170 for each receive signal path of the MIMO transceiver. The low frequency digital signal produced by receiver 166 is then produced to radar detection logic 170 and to signal processing block 174. Radar detection logic 170 is operable to detect the presence of either a traditional or a non-traditional radar signal.

In the described embodiments of the invention, radar detection logic 170 comprises state logic and/or circuit based logic for measure rise and fall times of a pulse, or more generally, pulse lengths that are produced to radar signal processing logic. Generally, logic 170 includes circuitry and/or logic for detecting traditional radar signals as described herein. Further, in the described embodiment, radar detection logic 170 includes an FM demodulator that is operable to demodulate a frequency modulated signal and, more particularly, a continually increasing frequency signal to produce an indication that the received signal was frequency modulated with a continually increasing frequency signal. Thus, logic 170 is operable to detect non-traditional radar signals as well as the traditional radar signals having short pulses. In the digital realm, the continually increasing signal of an FM modulated signal is represented by a phase ramp wherein an output of the radar detection logic indicates an FM modulated signal was received if the output is substantially larger than zero. A non-FM modulated signal appears substantially as noise producing a near zero or zero value output. Radar signal processing logic within the signal processing block then evaluates the data produced by the radar detection logic 170 to determine the presence of a radar signal including the new non-traditional radar signal pulses such as what is known as a bin-5 radar signal.

Figure 9:
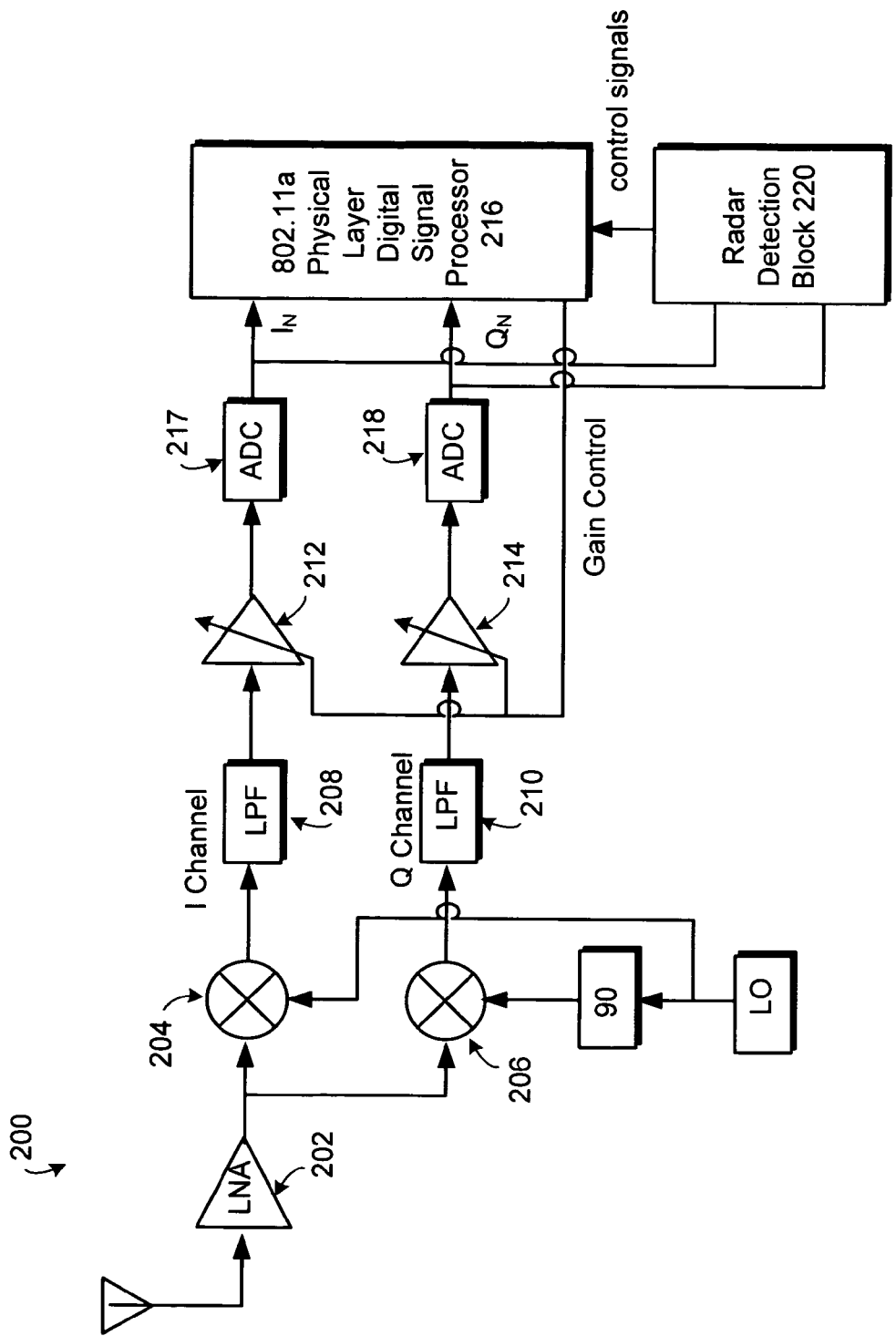
FIG. 9 is a functional block diagram of a portion of a radio transceiver according to one embodiment of the present invention.

FIG. 9 is a functional block diagram of a portion of a radio transceiver 200 according to one embodiment of the present invention. Initially, an RF signal received at an antenna is coupled to a low noise amplifier (LNA) 202. LNA 202 produces amplified RF to mixers 204 and 206. Mixer 204 mixes the amplified RF with a local oscillation to down-convert the RF to a low frequency signal (one of a baseband frequency or intermediate frequency signal) to create a down-converted in-phase (I) channel signal. Similarly, mixer 206 mixes the received amplified RF signal with a phase-shifted local oscillation, wherein the phase is shifted by 90°, to produce a down-converted quadrature phase (Q) channel low frequency signal. Low pass filters 208 and 210 are coupled to receive the down-converted I and Q channel signals, respectively, to produce filtered I and Q channel signals to a pair of variable gain amplifiers 212 and 214, respectively.

Variable gain amplifiers 212 and 214 further receive gain control signals from an 802.11(a) physical layer digital signal processor 216. Responsive to the gain control from processor 216, variable gain amplifiers 212 and 214 provide a corresponding amount of gain to the filtered I and Q signals and produce amplified I and Q signals to analog-to-digital converters 217 and 218. Analog-to-digital converters 217 and 218 then convert the amplified I and Q signals to digital to produce incoming I and Q digital signal streams to processor 216.

Radio transceiver 200 of FIG. 9 further includes a radar detection block 220 that is coupled to receive the incoming I and Q digital signal streams to detect the presence of a radar signal (traditional and non-traditional such as bin-5). Upon detecting the presence of a radar signal, radar detection block 220 produces control signals to processor 216 to prompt processor 216 to suspend communications over frequency bands that overlap with the radar frequency bands or that may interfere with the detected radar signal.

The operation and structure of radar detection block 220 is described in greater detail below. Generally, however, the radar detection block in this example provides at least received signal data to enable radar detection processing logic within processor 216 to determine whether a radar signal is present. Alternatively, radar detection block 220 includes logic and is operable to make the determination whether a radar signal is present and is further operable to provide the control signal to the processor 216 to inhibit transmissions. It should be further understood that the operation of FIG. 9 illustrates operation of just one receive signal path though the teachings of FIG. 9 may readily be applied in a MIMO transceiver to each receive signal path.

Figure 10:
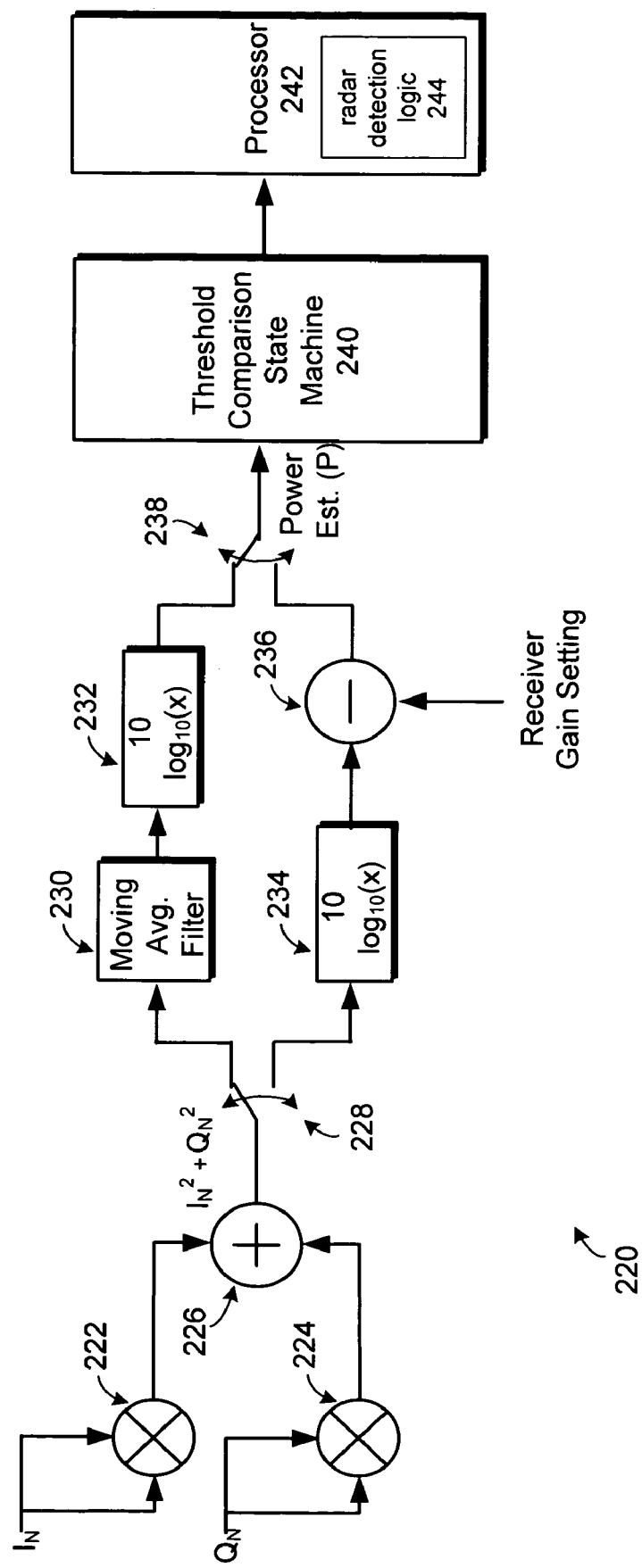
FIG. 10 is a block diagram of a radar detector block for use in an 802.11(a) receiver that may be within a traditional transceiver or within a MIMO transceiver operable to detect a traditional radar signal for a variety of signal waveforms including traditional radar pulses and 802.11(a) signals according to one embodiment of the invention.

FIG. 10 is a block diagram of a radar detector block for use in an 802.11(a) receiver that may be within a traditional transceiver or within a MIMO transceiver according to one embodiment of the invention. The 802.11(a) receiver as shown in FIG. 9 that includes radar detection block of FIG. 10 is a direct conversion type receiver, although the invention is applicable to a super-heterodyne receiver as well. Both direct conversion and super-heterodyne topologies are commonly used for 802.11 type wireless LANs.

The inputs to the radar detection block of FIG. 10 are the outputs of the analog-to-digital converters (ADCs) that are tapped off and produced to the radar detection circuit (as shown in FIG. 8, for example). The input signals produced by the ADCs are digital signals that are sampled at a sufficient rate and with a sufficient number of bits to facilitate use for radar detection. For example, a 40 MHz sampling rate at 8 bits of precision is adequate to detect radar systems in an 802.11 (a) environment.

Radar detection block 220 of FIG. 10 is operably coupled to receive the incoming I and Q digital signal streams produced by ADC 217 and ADC 218 of FIG. 9. As may be seen in FIG. 10, the incoming I and Q digital signal streams are received by mixers 222 and 224. Mixers 222 and 224 are operatively coupled to receive each of the incoming I and Q digital signal streams twice to square each of the incoming I and Q digital signal streams. In one embodiment of the invention, the mixers are Gilbert mixers that are operable to multiply the inputs (since the inputs are of approximate magnitudes). Accordingly, mixer 222 produces a squared I digital signal stream, while mixer 224 produces a squared Q digital signal stream. The squared I and Q digital signal streams are then produced to an adder 226 that sums the two squared signals to produce a summed I and Q squared signal stream to a switch 228.

In a first position, the summed I and Q squared signal stream is produced to moving average filter 230 that calculates a moving average of the summed I and Q squared signal stream. Moving average filter 230 then produces a moving average value to decibel conversion block 232, which converts the moving average value produced by filter 230 to decibel units.

Whenever switch 228 couples moving average filter 230 to adder 226, a switch 238 couples the output of decibel conversion block 232 to a threshold comparison state machine 240. Accordingly, the moving average, in decibels, is produced to threshold comparison state machine 240 for analysis as will be described below. Whenever switch 228 couples adder 226 to a decibel conversion block 234, however, the summed I and Q squared signal stream is produced to decibel conversion block 234 which produces the summed I and Q squared signal stream in decibels to a subtractor 236. Subtractor 236 is further coupled to receive and subtract a receiver gain setting from the summed I and Q squared signal stream in decibels. The output of subtractor 236 is then coupled, by switch 238, to threshold comparison state machine 240. Threshold comparison state machine 240 operates as described below to provide preliminary analysis of the detected power levels produced either by decibel conversion block 232 or subtractor 236 to a processor 242. Radar detection logic 244 within processor 242, then analyzes the preliminary analysis received from threshold comparison state machine 240 to determine whether a radar signal has been received.

This circuit of FIG. 10 computes the received power and applies either no filtering (option 1 in which both switches are in the low position) or a moving average filter (option 2 in which both switches are in the upper position). Option 1 is most effective for short pulse width radars when no interference is present. Option 2 is most effective with longer radar pulses in interference that looks random as is shown in FIG. 10.

The embodiment of FIG. 10, therefore, is a functional block diagram of a radar detection block operable to detect a traditional radar signal for a variety of signal waveforms including traditional radar pulses and 802.11 based communication signals. In general, the radar detection block will not have prior information concerning either the radar pulse width or interference. Consequently, in the described embodiment, logic drives switches 228 and 238 to the lower position (option 1) unless an 802.11(a) frame is being received (as determined during call setup signaling between an access point and a wireless host or communication device in one embodiment of the invention). In the case of 802.11(a) communications, option 2 is employed (the switches are toggled to the upward position as shown) during the duration of the frame.

When option 2 is employed during a received 802.11(a) frame, the thresholds are set to be relative to the average received power. Since the radar signal is typically a constant envelope signal, while the interference is more like Gaussian noise, the moving average filter will have the effect of improving the radar signal to interference power ratio by a factor of the square root of the filter length. The improvement is limited by the length of the radar pulse (i.e., maximum improvement is when the radar pulse fills the moving average filter). Thus, the threshold level and filter length are jointly selected based on the expected radar pulses length and the detection and false alarm probabilities.

Figure 11:
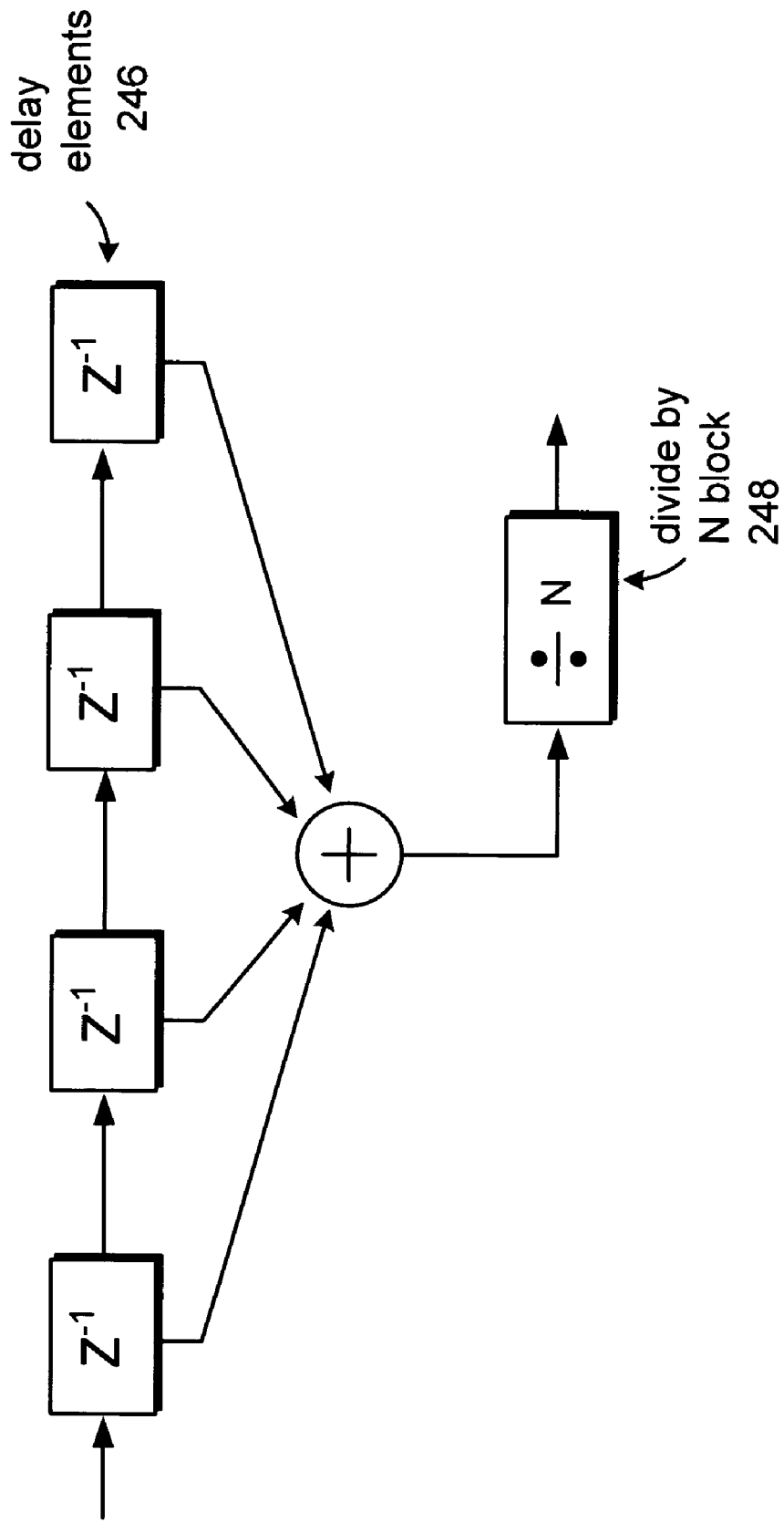
FIG. 11 is a functional block diagram of a moving average block as employed in one embodiment of the present invention.

FIG. 11 is a functional block diagram of a moving average block as employed in one embodiment of the present invention. The moving average filter effectively is an integrator and can improve the radar signal to interference level for many types of radar signals. In the described embodiment, four delay elements 246 are included coupled in series and having outputs that are further produced to an adder. A summed output from the adder is then produced to a divide by "N" block 248. The value of "N" in the divide-by-N block is equal to four in the described embodiment since there are four delay elements. The number of delay elements and the divisor "N" may each be modified according to particular requirements.

If it is assumed that the radar signal has a constant envelope, the I and Q components then take the form:

$$I(n) = A_r \cos(\omega_r nT + \phi)$$

$$Q(n) = A_r \sin(\omega_r nT + \phi)$$

where $A_r$, the radar signal amplitude, and $\omega_r$, the down-converted radar signal frequency, are constant (or approximately constant) during the radar pulse. The radar signal is zero outside of the received pulse. In contrast, the received 802.11(a) signal can be modeled as two Gaussian signals:

$$I(n) = G_i(n)$$

$$Q(n) = G_q(n)$$

The moving average filter of length n computes the following:

$$y = \sum_{i=1}^{k} I_i^2 + Q_i^2$$

With an input signal that is composed of a radar signal embedded within an 802.11(a) frame, the output of the moving average filter is:

$$I(n) = A_r \cos(\varpi_r nT + \varphi) + G_i(n)$$

$$Q(n) = A_r \sin(\varpi_r nT + \varphi) + G_q(n)$$

$$y = \sum_{i=1}^{k} A_r^2 (\cos^2(\varpi_r iT + \varphi) + \sin^2(\varpi_r iT + \varphi)) +$$

$$A_r \cos(\varpi_r iT + \varphi) G_i(i) + G_i^2(i) + A_r \sin(\varpi_r iT + \varphi) G_q(i) + G_q^2(i)$$

$$y = k A_r^2 + \sum_{i=1}^{k} A_r \cos(\varpi_r iT + \varphi) G_i(i) + G_i^2(i) +$$

$$A_r \sin(\varpi_r iT + \varphi) G_q(i) + G_q^2(i)$$

With the radar and signal model given above, y has a non-central chi-square distribution with 2 k degrees of freedom. Thus, the relative error in the measurement of y is given by:

$$\text{Relative Error} = (\text{standard deviation of } y)/(\text{mean of } y)$$

$$= \frac{\sigma_y}{m_y}$$

$$= \frac{\sqrt{4k\sigma_{wlan}^4 + 4kA_r^2\sigma_{wlan}^2}}{2k\sigma_{wlan}^2 + kA_r^2}$$

which decreases by a factor of the square root of k with increasing k.

Figure 12:
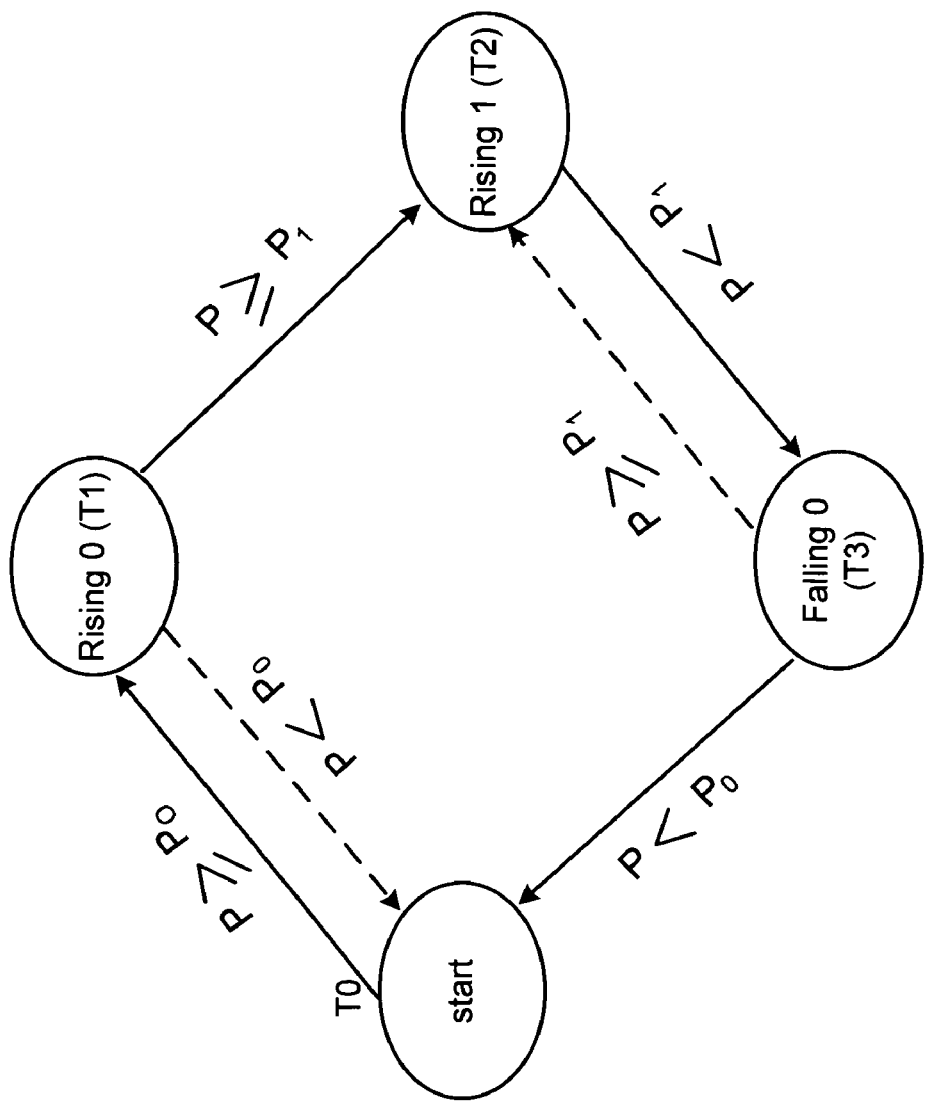
FIG. 12 illustrates a threshold comparison state machine.

FIG. 12 illustrates a threshold comparison state machine. This device measures the time instants when the radar pulse crosses two thresholds. The output takes the form of 4 time measurements: start time ($T_0$), rise time ($T_1$), pulse width ($T_2$), and fall time ($T_3$). A set of the 4 time measurements is recorded for every complete cycle back to start.

The state machine operates as follows. It originates in the start state and observes the incoming power estimate P. When P exceeds threshold $P_0$, the start time ($T_0$) is recorded and the state is advanced to Rising0. Once in Rising0, a counter is initiated to record the total time in that state ($T_1$). If the incoming power estimate drops below $P_0$, then the state machine is reset and it returns to Start.

When P exceeds the second threshold, $P_1$, the state machine advances to state Rising1. The time it spends in this state is recorded in T2. When P drops below $P_1$, the state machine advances to Falling0. The time in this state is recorded in $T_3$. If, while in the Falling0 state, P rises back up to $P_1$, then the state machine returns to the Rising1 state. $T_2$ is then incremented by the contents of $T_3$ and $T_3$ is reset. This process of moving back and forth between the Rising1 and Falling0 states can happen multiple times. After P drops below $P_0$, the state machine returns to Start and the complete set of 4 time measurements are forwarded to the processor.

The final radar detection decision is made by a programmable processor as shown in the embodiment of FIG. 8. In the embodiment of FIG. 9, however, the final radar detection decision may be made either in the processor or in radar detection block 220. Referring again to FIG. 10, processor 242, and more particularly, radar detection logic 244, periodically reviews the pulse data collected by the state machine 240, and compares it with the characteristics of known traditional radar signals. One key characteristic for determining radar presence, however, is the pulse repetition frequency. Thus, the processor is operable to match multiple received pulses with the same relative spacing. When a sequence of this type is observed, detection is declared. Otherwise, the pulse data is discarded, and the processor waits for new data. This multi-layer approach helps minimize false detections of traditional radar signals while maximizing the chances that actual radars are detected.

In the described embodiment of the invention, a processor receives the output of the state machine and logic defined therein (in radar detection block 244 of FIG. 10, for example) analyzes the output of the state machine to determine whether a radar signal has been received. It should be understood that the following logic, as defined in block 244 and executed by processor 242, may readily be formed in hardware as described before.

Figure 13:
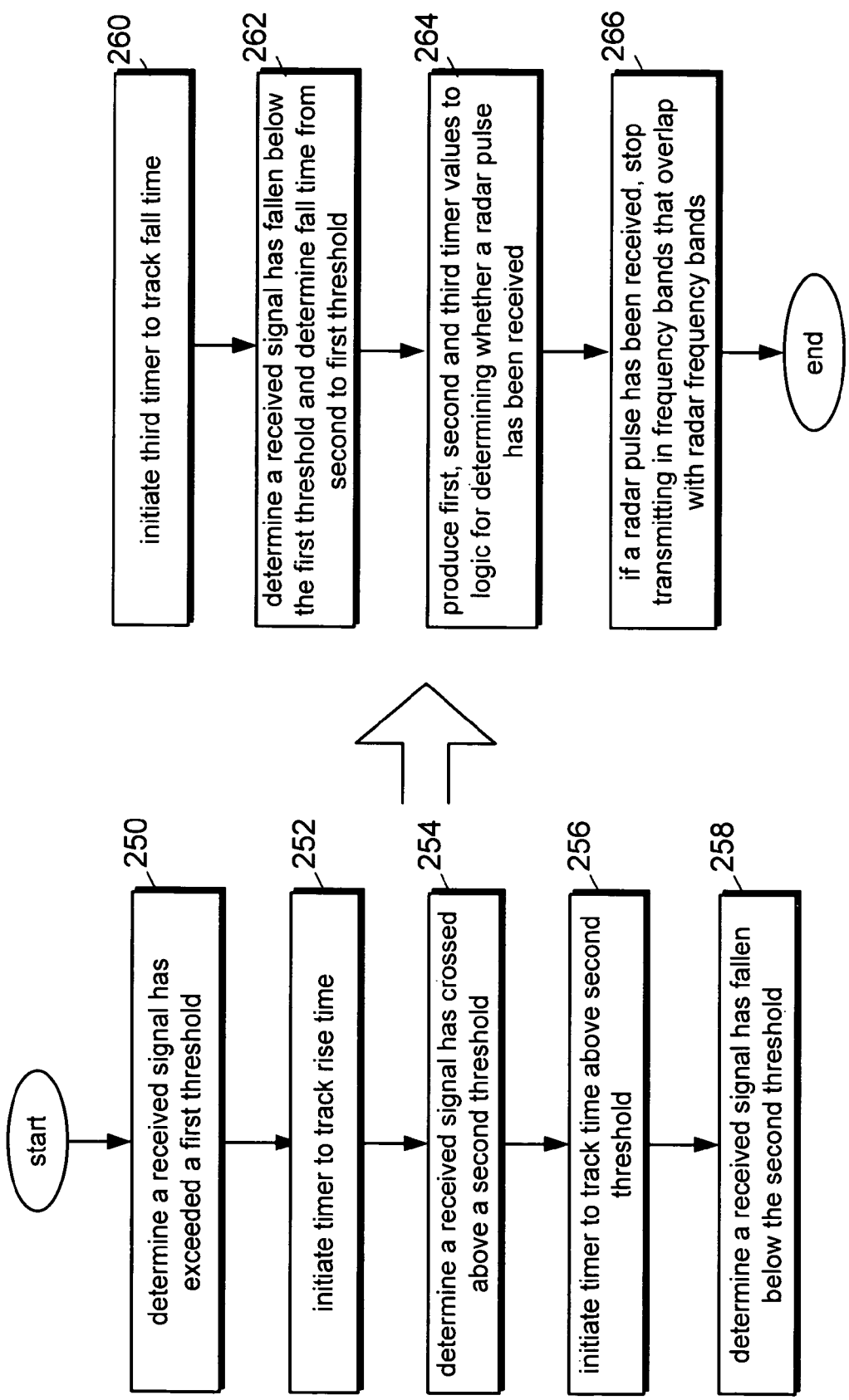
FIG. 13 is a flowchart that illustrates a series of steps that are performed according to one embodiment of the invention that are used for tracking radar, especially traditional radar.

FIG. 13 is a flowchart that illustrates a series of steps that are performed according to one embodiment of the invention that are used for tracking radar, especially traditional radar. Generally, the invention includes measuring signal characteristics to determine if a received signal has a characteristic of a radar pulse and to further determine whether a pattern of pulses is consistent with a radar pattern. More specifically, the invention includes determining whether a received signal has exceeded a first threshold (step 250) and, when the first threshold is exceeded, a timer is initiated to track or measure a rise time (step 252). The time is turned off and the rise time is determined when the rising signal crosses a second threshold. Thus, the invention includes determining that the received signal has crossed (the second threshold (step 254).

The embodiment of the invention further includes determining a pulse width. Thus, once the second threshold has been reached, the invention includes initiating a second timer to measure an amount of time above the second threshold (and therefore the pulse width) (step 256). The embodiment of the invention further includes determining a received signal has fallen below the second threshold (step 258). The difference in time between the two crossings of the second threshold define the pulse width of a received signal. If the second timer is initialized to start counting from zero, the value of the second timer represents the pulse width. In one embodiment, this pulse width is a key characteristic in determining whether a traditional radar signal has been received though, in an alternate embodiment, may also be used for determining whether a non-traditional radar has been received.

Once the second threshold is crossed in a downward position, meaning the received signal levels has crossed from above to below the second threshold, a third timer is initialized to track a fall time (step 260). Once the signal crosses the first threshold in the downward direction, the third timer is stopped and the fall time is determined (step 262), which fall is the time required for the signal level to fall from the second to the first threshold. Accordingly, the invention further includes producing first, second and third timer values to logic for determining whether a radar pulse has been received (step 264). Finally, if a radar pulse has been received, the method of the embodiment of the invention includes stopping all transmissions in frequency bands that overlap with radar frequency bands (step 266).

Figure 14:
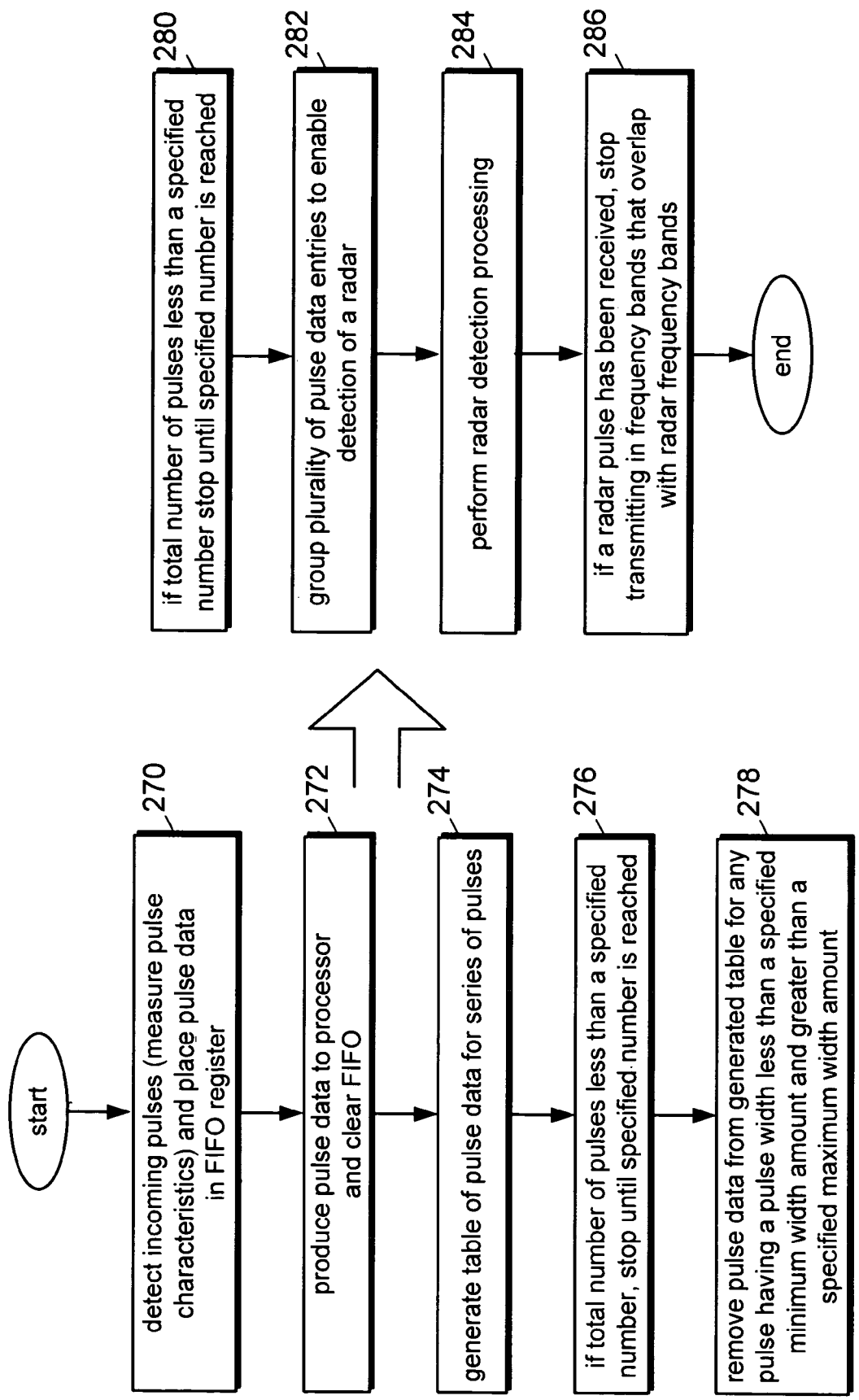
FIG. 14 is a flowchart illustrating a method for determining whether a radar signal is present according to one embodiment of the invention.

FIG. 14 is a flowchart illustrating a method for determining whether a radar signal is present according to one embodiment of the invention. For the described embodiment, it is assumed hardware of a radio receiver is continually filling a first in/first out (FIFO) with the pulse information. Moreover, in the described embodiment of the invention, the inventive method is repeated at periodic intervals of less than one second.

Initially, the invention includes receiving and detecting incoming pulses and placing the pulse information in a FIFO register to detect a traditional radar signal presence (step 270). Detecting the incoming pulses includes measuring pulse characteristics such as rise time, pulse width and fall time. Thereafter, the invention includes producing pulse information to a processor and clearing the FIFO (step 272). Generally, this step includes loading pulse data (pulse information) into the programmable processor (in the described embodiment) or other logic. In one embodiment, the pulse data is loaded by direct transfer such as by direct memory access (DMA).

After the pulse data is loaded, a table of pulse data is generated for a series of pulses (step 274). If the total number of pulses is less than a specified number, processing is suspended (stopped) until the specified number of pulses is listed within the table (step 276). In addition to adding pulse data to the table, the embodiment of the invention includes removing pulse information from the generated table for any pulse having a pulse width less than a specified minimum width amount and greater than a specified maximum width amount (step 278). In an alternate embodiment, pulse data is only placed within the table for further analysis if the pulse width is within a specified range for a given pulse. Accordingly, for this embodiment, the step of removing pulse data for such a pulse is unnecessary. In either embodiment, however, pulses that are either too long or too short to be a radar pulse are removed from the table of pulse data entries. Typical radar systems have pulses with a pulse width in the range of one to three microseconds.

The embodiment of the invention further includes determining whether a total number of pulses is less than a specified number and, if so, stops further processing until the table has pulse data for a specified number of pulses (step 280). In one embodiment of the invention, the specified number is equal to six. Thereafter, the invention includes grouping a plurality of pulse data entries to enable detection of a specified radar pulse (step 282).

In the described embodiment, the group of pulses are grouped by time. More specifically, a nominal value of 210 milliseconds is used to group pulses. In the very specific embodiment, such a grouping is referred to as an epoch. The epoch or group length is set to be long enough to perform radar detection processing (step 284) and to cover the burst lengths sufficiently long to detect desired radar systems. This step takes advantage of a radar characteristic of radar systems of pulses being transmitted and arriving in bursts. Although it is not known exactly how long the bursts will be for a radar, the nominal value of 210 milliseconds should be adequately long to facilitate identifying a received radar signal. Finally, if a radar pulse has been received, the invention includes inhibiting or stopping transmission in frequency bands that overlap with radar frequency bands (step 286).

Figure 15:
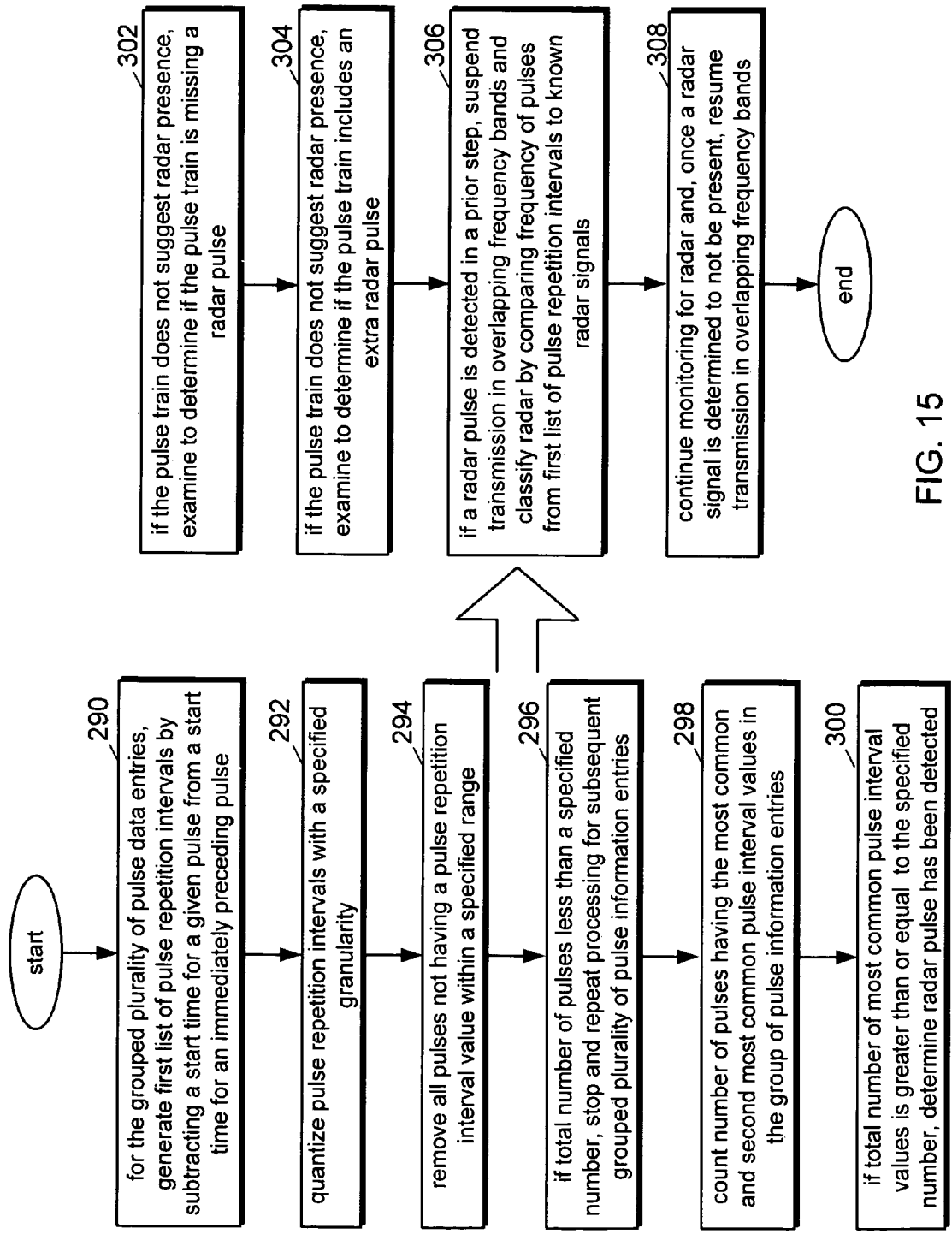
FIG. 15 is a flowchart of a method for performing radar detection processing for a traditional radar signal.

FIG. 15 is a flowchart of a method for performing radar detection processing for a traditional radar signal. In some cases, it is expected that a valid radar signal may not be detected due to interference with one or more pulses. Accordingly, the group of pulses for which no radar was detected is evaluated for a missing pulse. Thus, for the grouped plurality of pulse information entries (epoch), the invention includes generating a first list of pulse repetition intervals by subtracting a start time for a given pulse from a start time for an immediately preceding pulse for each pulse in the group (step 290). It is understood, of course, that this step cannot be performed for the first pulse.

Thereafter, the invention includes quantizing pulse repetition intervals with a specified granularity (step 292). Generally, received pulse data has a degree of resolution that is not necessary and may result in false determinations regarding radar detection conclusions. In one embodiment of the invention, the data is quantized to a resolution of 25 milliseconds and a smallest incremental value. Thereafter, the invention includes removing all pulses not having a pulse repetition interval value within a specified range (step 294). If the total number of pulses is less than a specified number (six in the described embodiment) the process is stopped and is repeated for a subsequent grouped plurality of pulse information entries (step 296).

Once a group of pulses (epoch in the described embodiment) contains a group of pulses that is equal to or exceeds the specified number of required pulses (six in the described embodiment), the invention includes determining (by counting) which pulses have the most common and second most common pulse interval values in the group of pulse information entries (step 298). The method further includes determining if a total number of most common pulse interval values is greater than or equal to the specified number and therefore determining that a radar pulse has been detected (step 300). If the pulse train (group of pulses) does not suggest radar presence, the invention includes examining the pulse train to determine if the pulse train is missing a radar pulse (step 302). The specific steps for determining that a radar is present notwithstanding a missing pulse is illustrated in relation to FIG. 16.

If analysis of the pulse train for missing radar pulses does not suggest radar presence, the invention includes examining the pulse train to determine if the pulse train includes an extra radar pulse (step 304). If a radar pulse is detected in any one of the prior steps, the invention further includes suspending transmission in overlapping frequency bands and classify radar by comparing frequency of pulses from first list of pulse repetition intervals to known radar signals (step 306). Finally, the invention includes continuing monitoring for radar and, once a radar signal is determined to not be present, resuming transmission of communication signals in overlapping frequency bands (radar bands) (step 308).

FIG. 15 illustrated a method for determining whether a radar signal is present and whether transmissions in overlapping frequency bands should be suspended. Within the steps of FIG. 15, there are two steps for determining whether a radar is present even if a pulse is missing (for example, due to interference) or if there is an extra pulse (for example, due to spurious noise or other noise source) in steps 304 and 306, respectively. Each of these two steps, however, further includes a series of steps for determining the same.

FIG. 16 is a flowchart that illustrated a method for performing radar detection processing for missing pulses according to one embodiment. Referring now to FIG. 16, the method includes evaluating whether a 2*pulse interval of a most common pulse interval value is equal to a pulse interval of a second most common pulse interval value (step 310). Additionally, the invention includes evaluating whether the 2*pulse interval of the second most common pulse interval value is equal to the pulse interval of the most common pulse interval value (step 312). Also, the invention includes determining if the total number of most common and second most common pulses is greater than the specified number (step 314). Finally, the invention includes determining that a radar pulse is present if any of the above three steps are true (step 316). Generally, if any of these steps yields a true result, then a radar is present and detectable even if interference prevents receipt of a radar pulse.

FIG. 17 is a flowchart illustrating a method for performing radar detection processing for extra pulses according to one embodiment. A type of interference that may interfere with radar detection for traditional radars is the introduction of a signal that appears to be a pulse. Thus, referring now to FIG. 17, an embodiment of an inventive method includes performing analysis for determining a radar signal is present even in the presence of an extra signal appearing as a pulse. More specifically, the invention includes for a grouped plurality of pulse data entries, generating a second list of pulse repetition intervals by subtracting a start time for a given pulse from a start time for a pulse preceding an immediately preceding pulse (step 318). Thereafter, the pulse repetition intervals are quantized with a specified granularity (step 320). The invention further includes removing all pulses not having a pulse repetition interval value within a specified range (step 322). The remaining pulse intervals of a first list of pulse repetition intervals are then compared to the second list of pulse repetition intervals (step 324). Finally, the invention includes evaluating whether if pulse periods match from the comparison, and if the total number of pulses in the second list of pulse repetition intervals is greater than a specified number, determining whether a radar is present (step 326).

In an alternate embodiment of the invention, an FM demodulator is used in a radar detection circuit. The FM demodulator is particularly helpful in detecting so called "Bin 5" radars which are less predictable and have longer lengths than other forms of radar. In yet another embodiment, a combination of the various radar circuits disclosed herein are jointly employed to maximize the detection of radar signals. Both FIGS. 16 and 17 relate, generally, to traditional radar signals.

Figure 18:
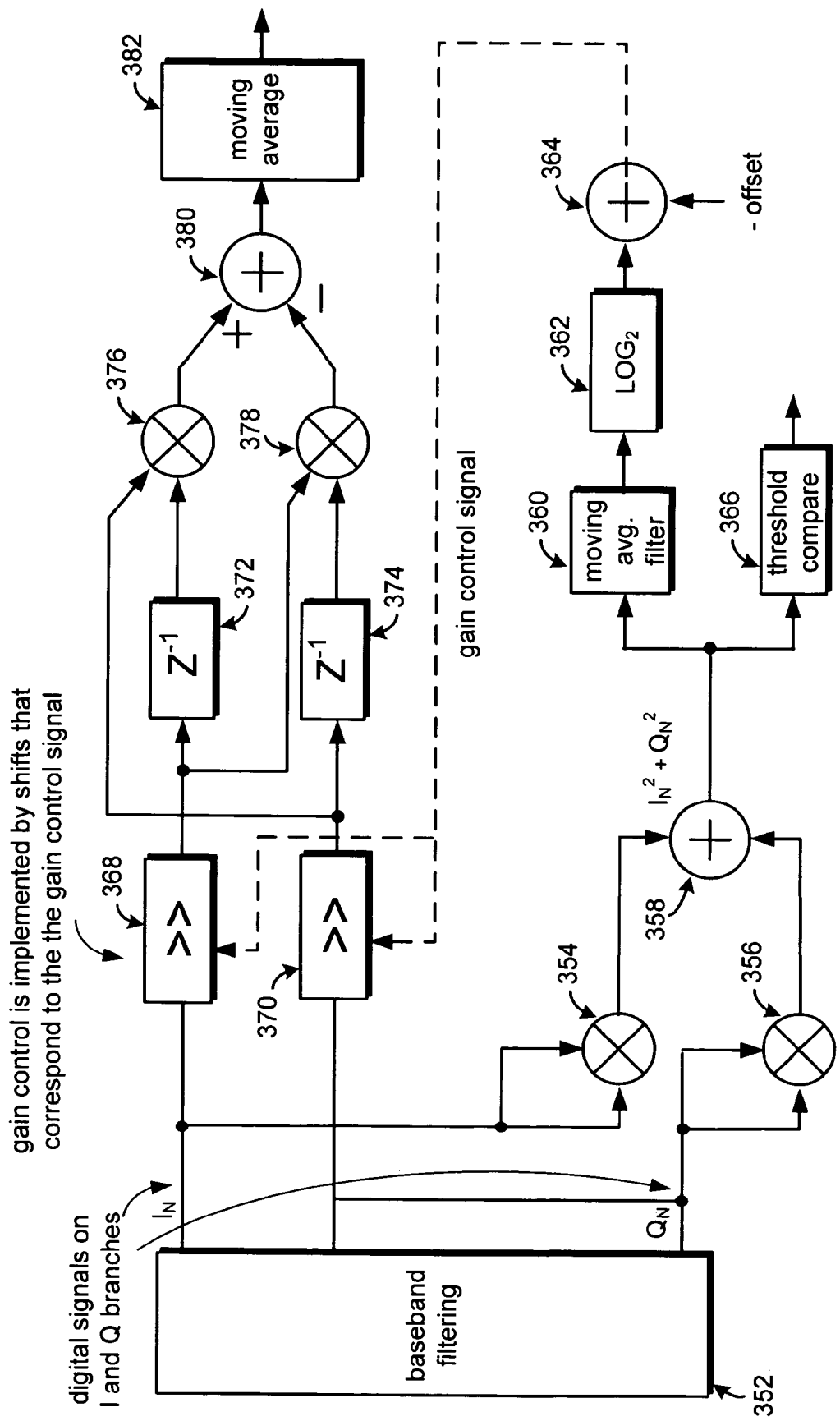
FIG. 18 is a functional block diagram of one embodiment of the invention of radar detection circuitry for detecting non-traditional radar pulses.

FIG. 18 is a functional block diagram of one embodiment of the invention of radar detection circuitry for detecting non-traditional radar pulses. Generally, the non-traditional radar pulse is characterized by a relatively long period as discussed in relation to FIG. 6 above. A traditional approach for detecting a radar pulse including measuring pulse lengths by detecting crossings of specified threshold signal strength/magnitudes (e.g., time between t1 and t2 of FIG. 7) could be used to detect a non-traditional radar pulse having a long period (e.g., 100 micro-seconds or more). It is possible, however, that a false positive could result from an orthogonal frequency division multiplexing (OFDM) signal especially if, for some reason, the receiver is not aware that an OFDM signal is being received. Thus, it is possible that the receiver will not accurately distinguish between an OFDM or non-traditional radar signal by merely analyzing a received signal for a long pulse.

If an OFDM signal is processed by an FM demodulator, however, the output appears as random noise. A non-traditional radar signal (e.g., bin-5 radar) that is processed by an FM demodulator, however, produces a linear ramp as an output because frequency increases at a constant rate for the non-traditional radar signal. Typically, the radar pulse initially is characterized by a low frequency offset and increases in frequency at a constant rate over course of pulse. Thus, a rudimentary FM demodulator may be used to detect the non-traditional radar. By averaging the signal, the output of the FM demodulator will be substantially equal to zero without a signal that continually increases in frequency to produce a phase ramp in the digital realm. For a signal that generates a digital phase ramp, however, averaging the signal still results in an output having a substantially large output value to enable the receiver to determine that radar was received.

More specifically, a linear frequency modulated signal has the form:

$$y(t) = e^{j2\pi(f_0 t + \phi(t))}$$

$$\phi(t_0) = \int_0^{t_0} kt\, dt = \frac{kt_0^2}{2}$$

wherein K is the modulation in Hz/second, and f0 is the carrier frequency in Hz. For a received signal y(t), K can be found by multiplying the conjugate of derivative of y(t):

$$y(t)\left(j\left(\frac{dy}{dt}\right)^*\right) = e^{j2\pi(f_0 t + \phi(t))}(j)\left(\frac{d}{dt}j2\pi(f_0 t + \phi(t))\right)^* e^{-j2\pi(f_0 t + \phi(t))}$$

$$= 2\pi\left(f_0 + \frac{d\phi(t)}{dt}\right)$$

$$= 2\pi(f_0 + kt)$$

For a real value of k, the expression may be written as:

$$y(t) = i(t) + jq(t)$$

$$\mathrm{Re}\left[y(t)\left(j\frac{dy}{dt}\right)\right] = i(t)\frac{dq(t)}{dt} - q(t)\frac{di(t)}{dt}$$

In a sampled system, the differential signals may be expressed as:

$$\mathrm{Re}\left[y(n)\left(j\frac{dy(n)}{dt}\right)\right] \approx i(n)\frac{q(n) - q(n-1)}{\Delta t} - q(n)\frac{i(n) - i(n-1)}{\Delta t}$$

$$= \frac{1}{\Delta t}[q(n)i(n-1) - i(n)q(n-1)]$$

The expression for the real part of the signal, therefore, may be implemented with an architecture shown in FIG. 18. Thus, a radio receiver 350 includes baseband filtering circuitry 352 that produces a stream of digital in-phase and quadrature phase signals ($I_N$ and $Q_N$) that are produced to two circuit blocks that operate in a parallel manner. Specifically, the digital signals on the I and Q branches are produced to I and Q path shift registers 368 and 370, respectively, to provide a gain adjustment by way of right shifts to the FM demodulator that is operably coupled downstream of the shift registers. The digital signals on the I and Q branches are also produced to a block that is operable to measure a power level of the received signal.

Specifically, the signals on the I and Q branches are produced to a pair of inputs for each of a pair of multipliers 354 and 356 which produce a square of each signal to a summing block 358. The output of the summing block is therefore a sum of the I and Q signals squared. The output of summing block 358 is then produced to a moving average filter 360 that produces a moving average for a specified number of samples to a $\mathrm{LOG}_2$ block 362. The output of block 362 is then produced to a summing block 364 that is operable to subtract a specified offset value. The output of the summing block 364 is then produced to the shift registers 368 and 370 that provide necessary gain adjustments to scale a signal to a manageable value for downstream circuitry.

Threshold compare block 366 is operably coupled to receive the output of summing block 358 as well and produces threshold crossing values to a downstream processor or radar detection logic that measures pulse lengths. Effectively, a threshold crossing as detected by threshold compare block 366 is a start time of a signal and initiates a counter to count the duration of the signal.

In relation to a similar structure described previously for detecting traditional radar pulses, the downstream radar detection logic defines a larger FIFO buffer in one embodiment for storing the outputs of threshold compare block 366 to determine pulse lengths in relation to a FIFO buffer used for storing threshold values used only for detecting traditional radar signals. The reason a larger FIFO buffer is used in one embodiment is that the longer pulse widths of the non-traditional radar signals required a larger FIFO for adequate resolution.

Referring back to FIG. 18, the in-phase and quadrature-phase outputs of the shift registers 368 and 370 are produced to delay elements 372 and 374, respectively, and to cross-coupled multipliers 378 and 376, respectively. Cross-coupled multipliers 376 and 378 are also coupled to receive a delayed output of delay elements 372 and 374, respectively. As such, multiplier 376 receives q(n) and i(n−1) to produces q(n)*i(n−1). Multiplier 378 receives i(n) and q(n−1) to produce i(n)*q(n−1). The output of summing block 380, which is operable to invert the sign of the output of multiplier 378, is equal to q(n)*i(n−1)−i(n)*q(n−1), which output is defined above in equation (9). The output is then averaged over a specified number of samples (approximately 30 in the described embodiment) by moving average block 382. The values going out of summing block 380 and into moving average block 382 reflect an instantaneous frequency. Thus, moving average block 382 produces an average of instantaneous frequency in the described embodiment of the invention. It should be understood that any type of filter may be used. The described embodiment includes a moving average filter because of its simplicity and low cost. Generally, any type of smoothing and averaging function may be utilized. Generally, an OFDM signal results in an average signal magnitude value of zero or a very small number near zero. Thus, moving average block 382 is operable to reduce erroneous conclusions based upon a signal spike or an increased noise signal. The outputs of moving average block 382 are then produced to a FIFO buffer. In the described embodiment, the FIFO buffer is located in a physical layer but the radar detection logic exists in an upper layer that is operable to evaluate the contents of the FIFO and the duration of the pulse by evaluating the output of threshold compare block 366 to determine whether a bin-5 type radar is present. Finally, it should be understood that, in the described embodiment, there exists one FIFO buffer for each antenna of a multi-antenna receiver.

Figure 19:
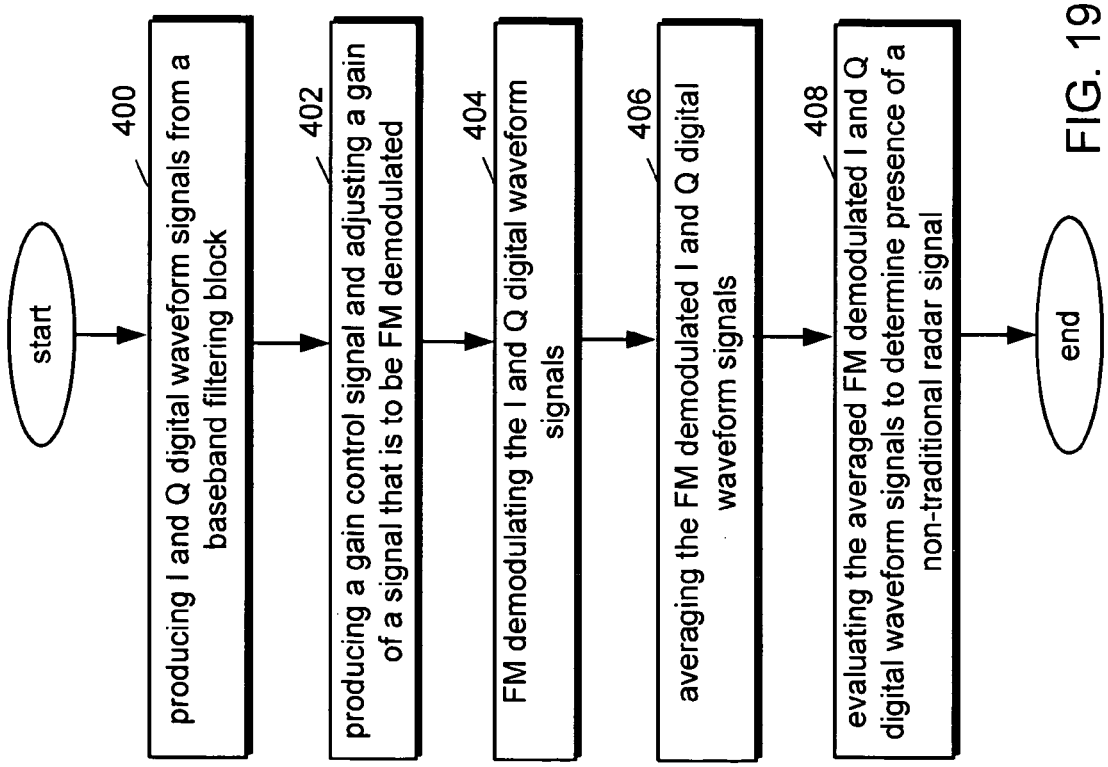
FIG. 19 is a flow chart that illustrates operation of a radio receiver according to one embodiment of the invention.

FIG. 19 is a flow chart that illustrates operation of a radio receiver according to one embodiment of the invention. The method includes initially producing I and Q digital waveform signals from a baseband filtering block (step 400). Thereafter, the method includes producing a gain control signal and adjusting a gain of a signal that is to be FM demodulated (step 402). The step of producing a gain control signal includes, in one embodiment, squaring each of the in-phase and quadrature-phase signals and summing the squared signals, filtering to generate a moving average of the sum, taking a log of the moving average value and subtracting an offset. A shift register then performs a right shift based upon the gain control signal. Other methods for generating a gain control signal may be used. Generally, however, a desired result is to reduce or increase a gain of a signal produced to an FM demodulator to produce a signal to the FM demodulator having a magnitude within a specified range defined at least in part by capabilities of downstream components.

The subsequent step is to FM demodulate in-phase and quadrature-phase digital waveform signals (step 404). In the described embodiment, a simple demodulator is used that primarily provides an output that reflects whether an input signal was FM modulated. As described before, an FM modulated signal produces a phase ramp in the digital domain which phase ramp may be used to identify the presence of a frequency modulated radar. The FM demodulated signal is then averaged (step 406) and evaluated to determine the presence of a non-traditional radar signal (step 408).

Figure 20:
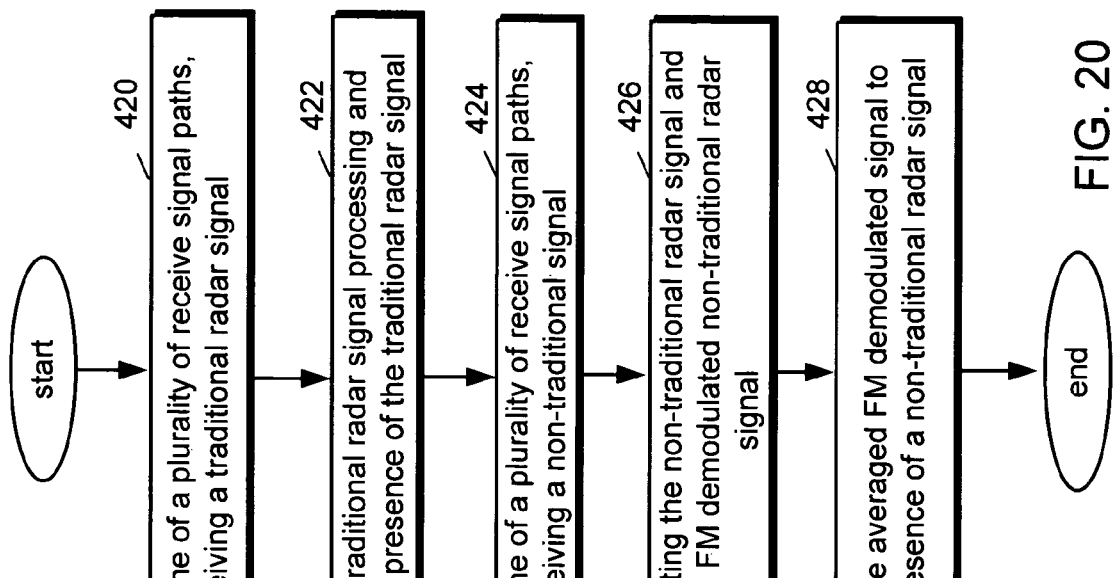
FIG. 20 is a flow chart that illustrates a method for detecting traditional and non-traditional radar signals according to one embodiment of the invention.

FIG. 20 is a flow chart that illustrates a method for detecting traditional and non-traditional radar signals according to one embodiment of the invention. The method includes, for at least one of a plurality of receive signal paths, receiving a traditional radar signal (step 420). Thereafter, the method includes performing traditional radar signal processing and detecting the presence of the traditional radar signal (step 422). In addition, the method includes for at least one of a plurality of receive signal paths, receiving a non-traditional signal (step 424). The method also includes FM demodulating the non-traditional radar signal and averaging the FM demodulated non-traditional radar signal (step 426). Finally, the method includes evaluating the averaged FM demodulated signal to determine presence of a non-traditional radar signal (step 428). It should be understood that the method of FIG. 20 is a high level description of the method and that other described steps may be included as well.

Figure 21:
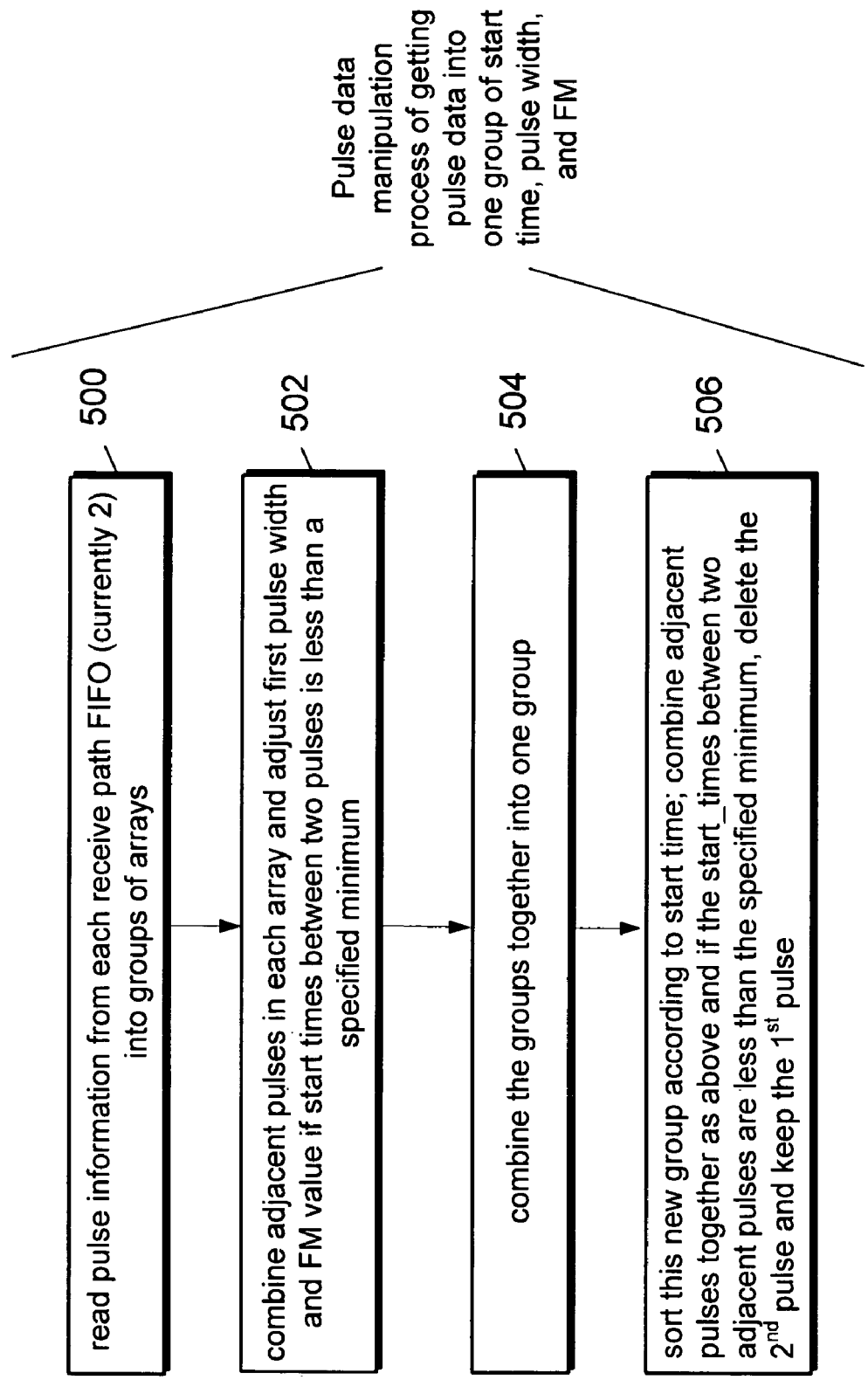
FIG. 21 is a flow chart that illustrates a method for processing pulses as a part of determining the presence of a radar signal according to one embodiment of the invention.

FIG. 21 is a method according to one embodiment of the invention for getting pulse data into one group for processing as a part of determining whether a non-traditional radar with long pulses is being detected. Generally, one aspect of the method of FIG. 21 includes determining if pulse start times are triggered due to nulls and other interference that might reset a start time while a long radar pulse is being received. For example, if a threshold detector detects a threshold crossing and indicates a start time at the beginning of a long radar pulse, a null may cause the start timer to reset. Since long radar pulses are determined in part by the length of the pulse, such a null may result in the long radar pulse not being detected. As such, FIG. 21 illustrates a method for eliminating a subsequent start time to determine that two shorter pulses actually were part of one longer pulse.

Specifically, the method includes reading pulse information from each receive path FIFO buffer (currently 2 FIFO buffers in the described embodiment) into groups of arrays (step 500). Each group contains a start time array, a pulse width array, and an FM value array and may be seen as an array of the form:

(Start_time_0, Pulse_width0, FM_0)
(Start_time_1, Pulse_witdth_1, FM_1)
...
(Start_time_n, Pulse_width_n, FM_n)

The method also includes combining adjacent pulses in each array (step 502). If the difference in start times between two adjacent pulses is less than a minimum spacing value (MIN_SPACING in the described embodiment), the method includes deleting the second pulse and setting the pulse width for the first pulse equal to the combined pulse width of the two original pulse widths and setting an FM value equal to the sum of the two originally determined FM values. Thus, when receiving a non-traditional radar pulse, receiver operation may result in a null being generated in the middle of a non-traditional pulse being received. This will prevent the pulse from appearing as two separate pulses. When the spacing value are less than a specified value, the radar detector is operable to determine that a null or other operational anomaly occurred thereby driving the conclusion that the two pulses are actually just one pulse and should be combined. Finally, the method of step 502 includes repeating the process for all pulses in each array.

Thereafter, the method includes combining all groups (in the described embodiment, at least two groups) into one group (step 504).

The new group is then sorted according to start time (step 506). Adjacent pulses are combined together again as described above, but if the start times between two adjacent pulses are less than the specified minimum spacing (e.g., MIN_SPACING in the described embodiment), the 2nd pulse is deleted and the 1st pulse is kept but the pulse widths and FM values are not combined or added. FIG. 21 thus presents a method for a first part of a two-part process for determining whether a long radar pulse has been detected. Generally, FIG. 21 illustrates a preliminary data manipulation stage to prepare pulse data for an analysis that will then, in a second part of a two-part process, determine whether a non-traditional long radar pulse exists.

Figure 22:
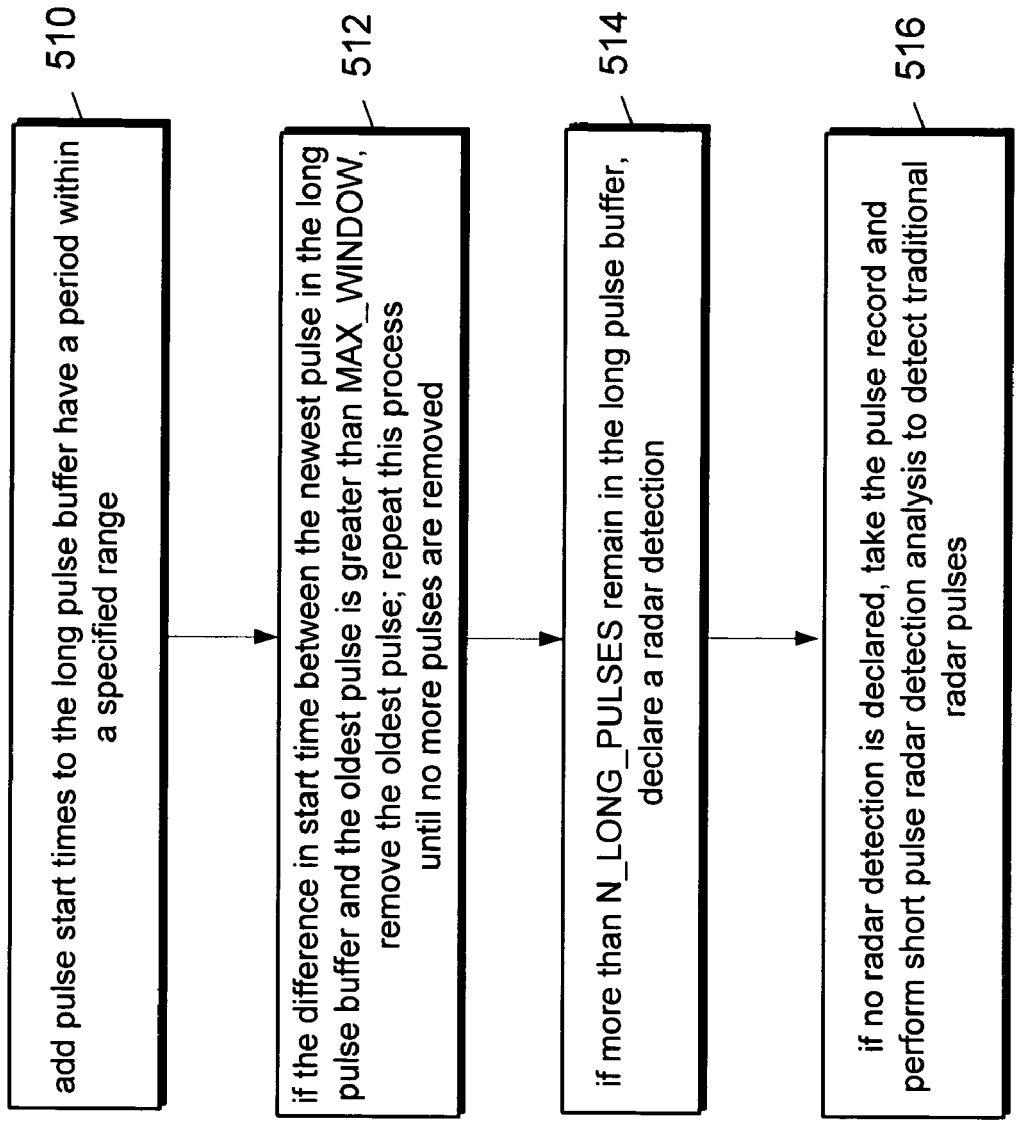
FIG. 22 is a flow chart that illustrates a method for determining whether a specified type of radar pulse has been detected according to one embodiment of the invention.

FIG. 22 is a flow chart that illustrates one embodiment for determining whether a non-traditional radar has been detected. Generally, an FM demodulator is used to detect the presence of non-traditional radar signals such as "Bin-5" radar signals that typically have a much longer pulse width than traditional radar signals. Because OFDM transmissions could appear as very long period signals thereby generating false triggers if mere pulse width is used to identify non-traditional radar signals, the embodiments of the invention include using an FM demodulator to detect a non-traditional radar signal since an OFDM signal would appear as noise to the FM demodulator. Thus, determining an FM value helps distinguish real FM radar pulses from 802.11 frames that may falsely trigger a radar detection.

Thus, the embodiment includes adding pulse start times to the long pulse buffer that meet the criteria: the determined pulse width is between a specified minimum pulse width (MIN_WIDTH in one embodiment) and a maximum pulse width (MAX_WIDTH in one embodiment) (step 510).

A pulse is potentially a radar pulse if an FM detected pulse width is greater than a specified pulse width value and is generally determined by the formula FM>MIN_FM where "FM" represents the absolute value of the difference of the estimate of the frequency at the start of the pulse and the estimate of the frequency at the end of the pulse as determined by the FM demodulator. Stated differently, a positive value for "FM" reflects a continuously increasing frequency which is detected by an FM demodulator to generate a continuously increasing output of a filter such as moving average block 382.

If the difference in start time between the newest pulse in the long pulse buffer and the oldest pulse is greater than a specified value (a variable identified as MAX_WINDOW in one embodiment of the invention), the oldest pulse is removed. This process is repeated until no more pulses are removed (step 512). In one embodiment, this specified value is 8 seconds.

If more than a specified number of long pulses detected by the FM demodulator (a variable named N_LONG_PULSES is used in one embodiment) remain in the long pulse buffer, a radar detection is declared (step 514). In the described embodiment, the long pulse buffer is implemented as a sliding window having, typically, an 8 second window length or period. Thus, when a specified number of pulses are detected and recorded in this long pulse buffer (sliding window), a radar signal (non-traditional radar) is determined to be detected and declared to inhibit conflicting transmissions. If no radar detection is declared, the pulse record is used to perform the short pulse radar detection for traditional radar pulses (step 516) as described in earlier relation to earlier figures.

Figure 23:
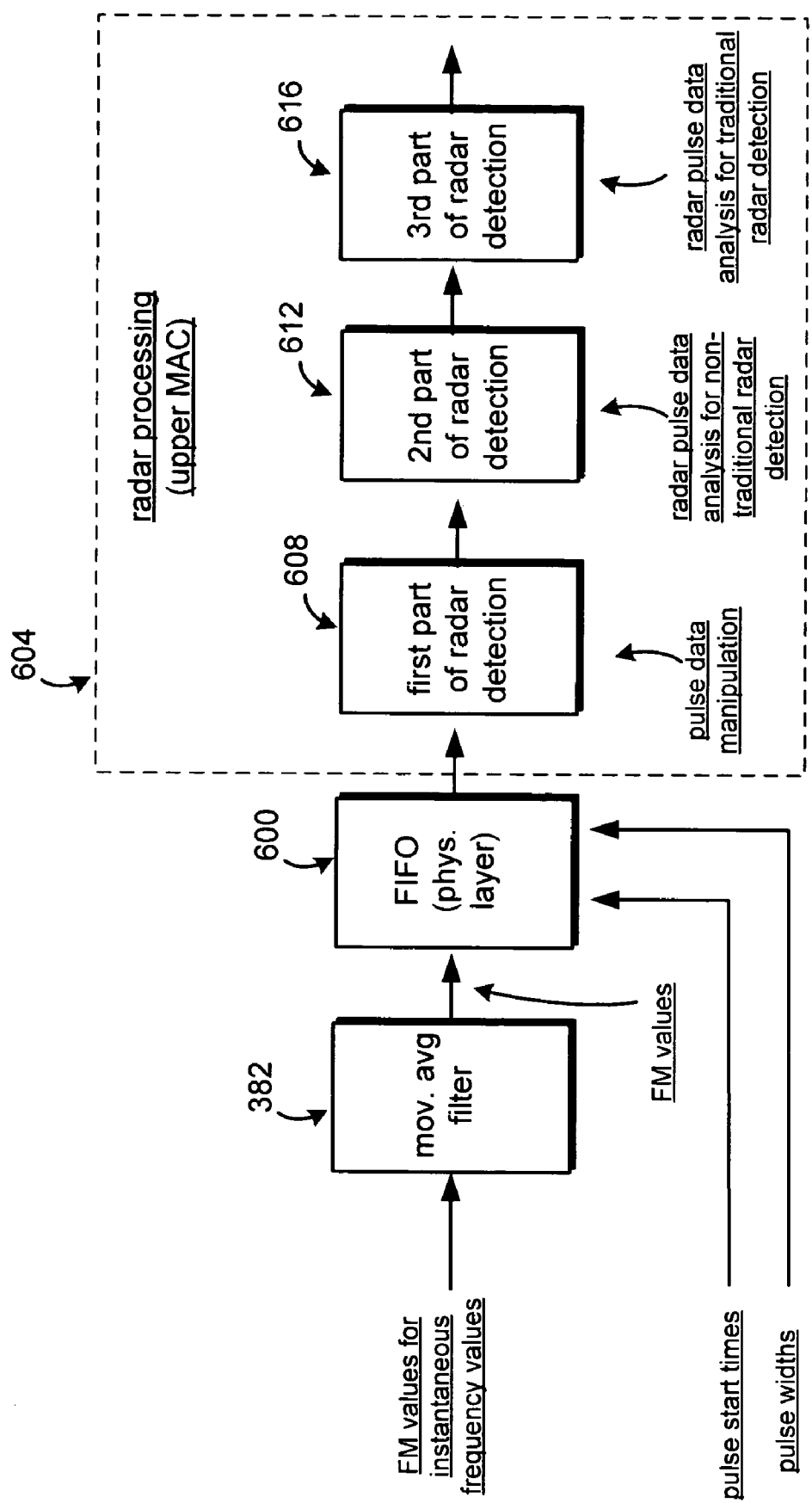
FIG. 23 is a functional block diagram for a system for detection traditional and non-traditional radar signals according to one embodiment of the invention.

FIG. 23 is a functional block diagram for a system for detection traditional and non-traditional radar signals according to one embodiment of the invention. Generally, the circuitry of FIG. 23 is operable to FM demodulate a received signal, manipulate and analyze long pulse data to determine if a non-traditional radar presence exists and, if not, to determine whether a traditional radar signal exists. The system includes, therefore, receiving FM values for instantaneous frequency values into a moving average filter. The FM values may be generated by FM demodulation circuitry, as shown in relation to FIG. 18, and is received by a filter which, here, is moving average filter 382. The outputs of the FM demodulation logic or circuitry is then produced to a filter which, in the described embodiment, comprises filter 382. A filtered value produced by filter 382 indicates the presence of a phase ramp which, in the frequency domain, reflects a frequency modulated signal with a continuously increasing frequency. The output of filter 382 is then produced to a long pulse FIFO 600 which stores pulse data for received pulses. Specifically, FIFO 600 is operably disposed to receive FM values from filter 382 as well as pulse start times and pulse widths as determined from logic such as that shown in relation to FIG. 18. In the described embodiment, FIFO 600 is formed at the physical layer. A radar processing block 604 then processes and analyzes the data long pulse FIFO 600 to determine the presence of a non-traditional radar. In the described embodiment of the invention, radar processing block 604 is implemented in an upper medium access control (MAC) layer.

In a first part of radar detection logic 608, pulse data is manipulated to eliminate the effects of nulls and other anomalies during the presence and detection of a non-traditional long pulse radar. The method is similar to that described in relation to FIG. 18. The manipulated data is then evaluated in a second part of radar detection logic 612 to determine whether a non-traditional radar has been detected. The method is similar to that described in portions of FIG. 18 and FIG. 19. Finally, if logic 612 determines that a non-traditional radar has not been detected, the method includes determining in a third part of radar detection logic 616 whether a traditional radar signal is present as described in relation to FIGS. 4-17.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. Any aspect shown in any of the embodiments of the described invention, may, for example, be combined with aspects of other embodiments for yet another embodiment of the present invention. As may be seen, the described embodiments may be modified in many different ways without departing from the scope or teachings of the invention.

What is claimed is:

1. A method for detecting radar performed within a wireless communication transceiver, comprising:
    reading pulse information from each of a plurality of radio frequency transceiver receive path first in first out buffers (FIFOs) into groups of arrays, wherein each group of arrays includes a start time array, a pulse width array, and an FM value array wherein the FM values represent an absolute value of a difference of an estimate of a frequency at a start of the pulse and an estimate of a frequency at an end of the pulse as determined by an FM demodulator;
    combining adjacent pulses in each array wherein, if the difference in start times between two adjacent pulses is less than a specified minimum spacing value, the method includes deleting the 2nd pulse and setting the pulse width for the first pulse equal to the combined pulse width of the two original pulse widths; and
    setting an FM value equal to the sum of the FM values of the two original pulse widths of the adjacent pulses.

2. The method of claim 1 wherein the process is repeated for all pulses in the arrays of pulse information.

3. The method of claim 2 wherein the method is performed for each FIFO for each antenna.

4. The method of claim 1 further including combining each group of arrays into a single group.

5. The method of claim 4 further including sorting the pulses within the single group according to start time.

6. The method of claim 5 further including combining pulses again and, if the start time between two adjacent pulses is less than a minimum spacing value, deleting the second pulse and keeping the first pulse without adding the pulse widths.

7. The method of claim 6 further including repeating the step of deleting the second pulse and keeping the first pulse without adding the pulse widths until no more pulses may be deleted.

8. The method of claim 7 further including determining whether a remaining number of pulses exceeds a specified value to determine that a long non-traditional radar has been detected.

9. The method of claim 7 further including determining whether a remaining number of pulses does not exceed a specified value to determine that a long non-traditional radar has not been detected.

10. The method of claim 9 further including performing traditional radar analysis to determine a traditional radar signal is present.

11. A method for detecting a radar signal, comprising:
    receiving, in at least one receive path of a radio transceiver, a radar signal;
    adding pulse start times to a long pulse buffer for each pulse having a pulse width that is greater than a minimum width value and less than a maximum width value wherein the minimum width value is greater than a maximum pulse width of a traditional radar pulse to detect a non-traditional radar pulse having a pulse width that is substantially greater than a traditional radar signal pulse width;
    if a difference in start times between the newest pulse in the long pulse buffer and the oldest pulse is greater than a maximum window value, removing the oldest pulse;
    repeating previous step until no more pulses are removed; and
    if a number of pulses greater than a specified number of long pulses remain in the long pulse buffer, determining that a radar signal has been detected.

12. The method of claim 11 further including, if a radar signal is not detected because the number of pulses was not greater than the specified number of long pulses, performing radar pulse detection for traditional radar signals.

13. The method of claim 11 wherein the method is operable to detect non-standard radar pulses having non-traditional long pulse lengths.

14. The method of claim 11 wherein the method is operable to detect bin-5 category radar signals.

15. A method in an integrated circuit radio transceiver, comprising:
    detecting traditional short pulse radar signals;
    detecting non-traditional long pulse radar signals;
    inhibiting wireless transmissions from a radio transceiver upon detection of either a short pulse or a long pulse radar signal; and
    reading pulse information from each receive path first in first out buffer (FIFO) into groups of arrays, wherein each group of arrays includes a start time array, a pulse width array, and an FM value array;
    combining adjacent pulses in each array wherein, if the difference in start times between two adjacent pulses is less than a specified minimum spacing value, deleting the 2nd pulse and making the pulse width for the first pulse equal to the combined pulse width of the two original pulse widths; and
    setting an FM value equal to the sum of the FM values of the two original pulse widths of the adjacent pulses.

16. The method of claim 15 further including combining each group of arrays into a single group and for sorting the pulses within the single group according to start time.

17. The method of claim 15 further including combining pulses again and, if the start time between two adjacent pulses is less than the specified minimum spacing value, deleting the second pulse and keeping the first pulse without adding the pulse widths.

18. The method of claim 15 further including adding pulse start times to a long pulse buffer for each pulse having a pulse width that is greater than a specified minimum width value and less than a specified maximum width value.

19. The method of claim 15 further including, if a difference in start times between the newest pulse in the long pulse buffer and the oldest pulse is greater than a maximum window value, removing the oldest pulse and for repeating this step until no more pulses are removed.

20. The method of claim 19 further including determining that a radar has been detected if a number of pulses greater than a specified number of long pulses remain in the long pulse buffer.

21. The method of claim 19 further including, if a radar signal is not detected because the number of pulses was not greater than the specified number of long pulses, performing radar pulse detection for traditional radar signals.

22. The method of claim 19 further including detecting bin-5 category radar signals.

* * * * *